United States Patent [19]

Suzuki et al.

[11] Patent Number: 5,544,493
[45] Date of Patent: Aug. 13, 1996

[54] AIR-CONDITIONING DEVICE FOR ELECTRIC AUTOMOBILES

[75] Inventors: Takahisa Suzuki, Kariya; Kunio Iritani, Anjo; Hiroshi Ishikawa, Hazu-gun; Akira Isaji, Nishio, all of Japan

[73] Assignee: Nippondenso Co., Ltd., Japan

[21] Appl. No.: 271,464

[22] Filed: Jul. 7, 1994

[30] Foreign Application Priority Data

Jul. 7, 1993 [JP] Japan ..................... 5-167709
Dec. 27, 1993 [JP] Japan ..................... 5-351649

[51] Int. Cl.⁶ ............................................. F25D 21/06
[52] U.S. Cl. ........................... 62/133; 62/156; 62/236; 62/228.4
[58] Field of Search ..................... 62/151, 133, 239, 62/243, 244, 230, 154, 228.4, 236, 156

[56] References Cited

U.S. PATENT DOCUMENTS

| 3,653,223 | 4/1972 | Jones et al. | 62/151 X |
| 4,720,980 | 1/1988 | Howland | 62/236 X |
| 5,105,096 | 4/1992 | Waldschmidt et al. | 62/151 X |
| 5,284,025 | 2/1994 | Kajitani et al. | 62/244 |

FOREIGN PATENT DOCUMENTS 55-005017  2/1980  Japan.
56-044562  4/1981  Japan.

Primary Examiner—Harry B. Tanner
Attorney, Agent, or Firm—Cushman Darby & Cushman, LLP

[57] ABSTRACT

The invention prevents the temperature of supplied air from being decreased by a defrosting operation when a vehicle is in operation. During the heating operation, it is judged whether the vehicle is in operation. When the vehicle is in operation, it is judged whether an external heat exchanger is frosted or not relying upon the external air temperature, temperature of the external heat exchanger (coolant) and the time of heating operation. When it is judged that frost is formed, the rotational speed of the compressor is increased to increase the ability to supplying the coolant, to maintain heating ability and to prevent the drop of temperature of the supplied air. When the frost is formed after the operation of the vehicle has been finished, it is judged whether the secondary batteries are being charged or not, i.e., whether the charging circuit of the secondary batteries is connected to the external power source for charging or not. When it has not been connected, the device waits until it is connected, and the defrosting operation is executed at a moment when the charging circuit is connected.

7 Claims, 13 Drawing Sheets

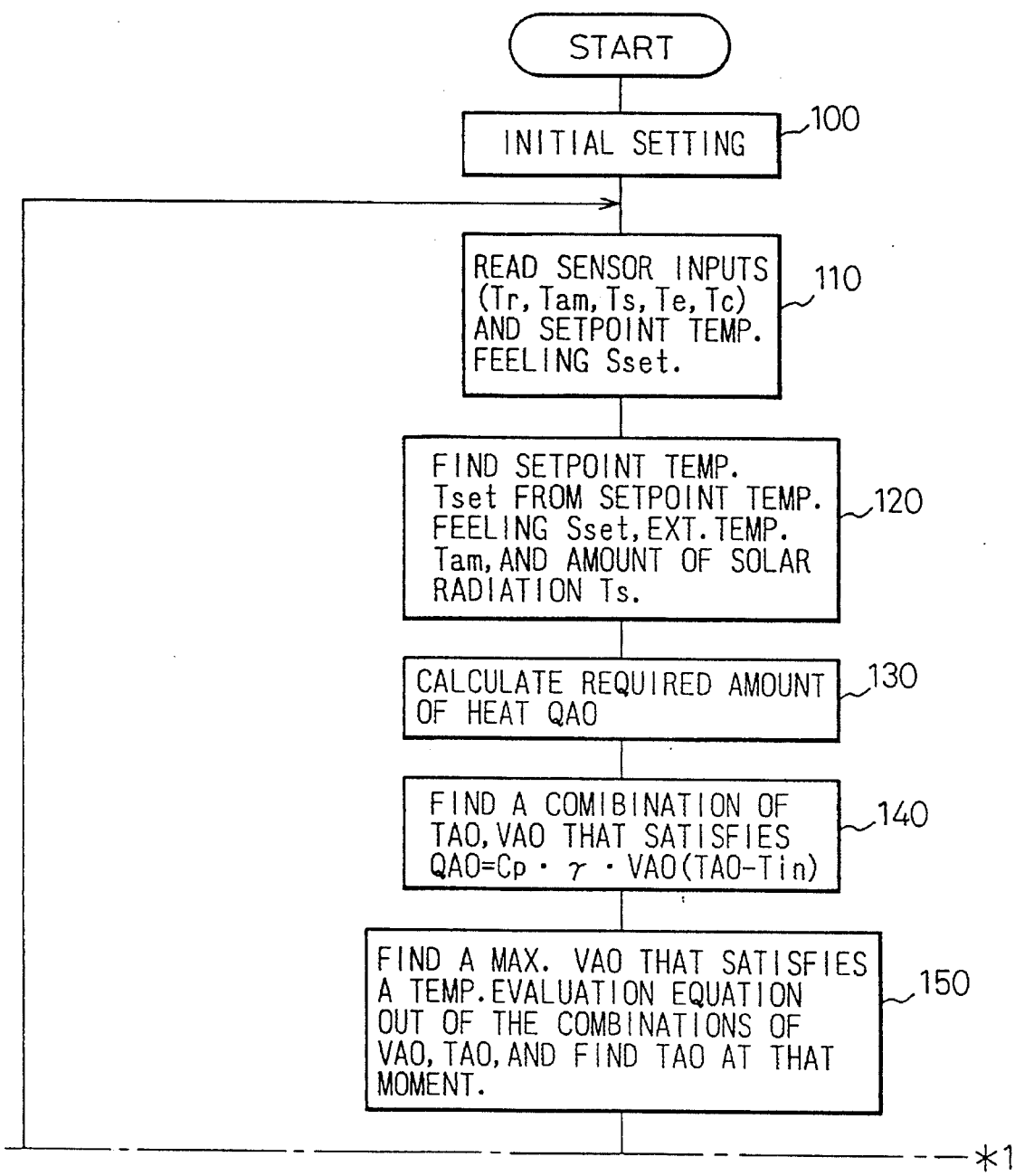

Fig. 4

| | INPUT | | OUTPUT |
|---|---|---|---|
| OPERATION MODE OF REFRIGERATING CYCLE 55 | COMPRESSOR 56 | OUTPUT DATA FROM SENSORS | OPERATION MODE OF OUTDOOR FAN 89 |
| COOL | ON | Tam 22↔25 (°C) | HI / LO |
| HEAT | ON | Tam 13↔16 (°C) | HI / LO |
| DESICCATE H | ON | Te 2↔3↔4 (°C) | HI / LO / OFF |
| DESICCATE C | ON | Pd 17↔18 (kgf/cm²G) 19, Td 109↔110 (°C) | HI / LO / OFF |

DESICCATE

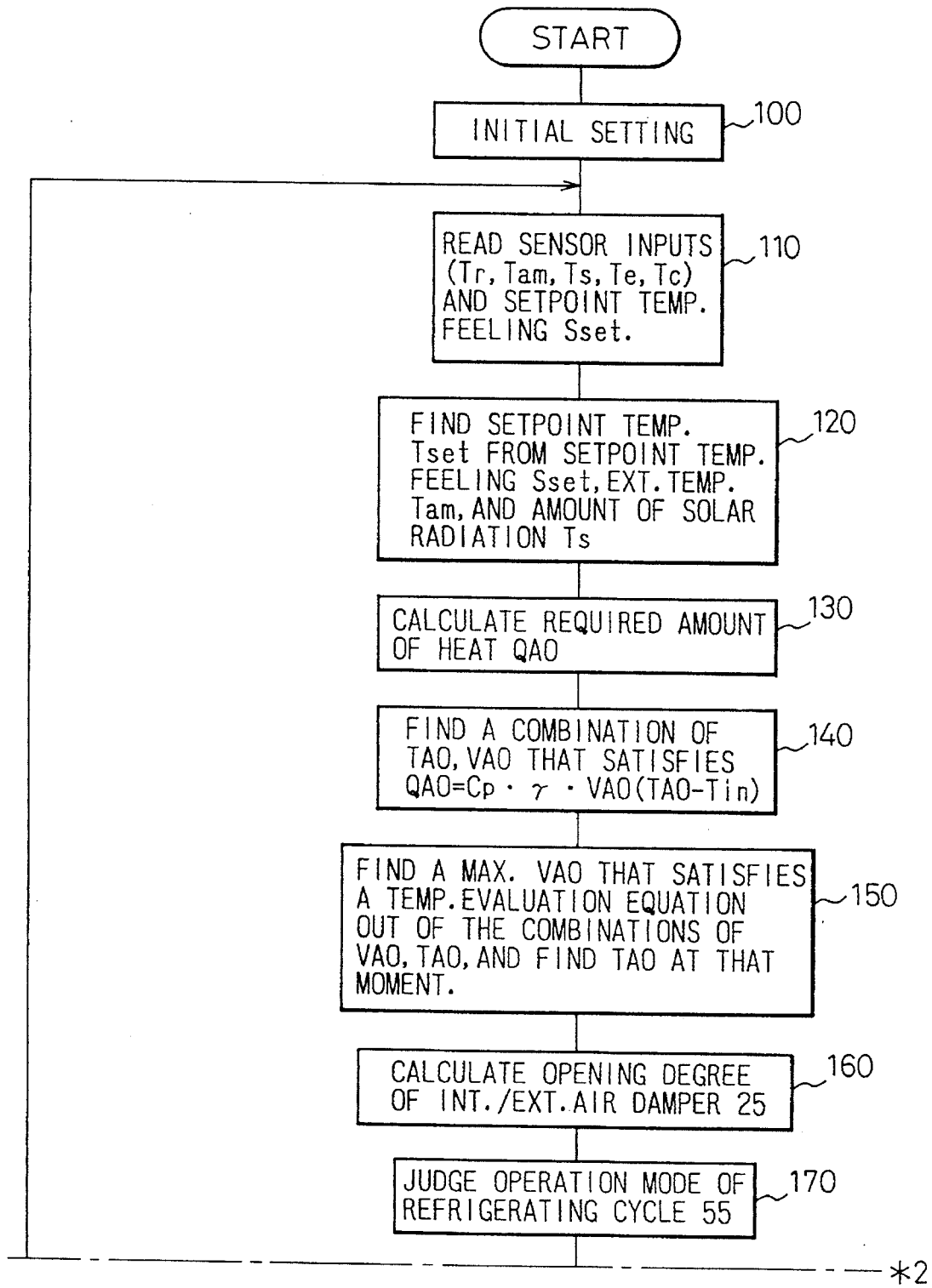

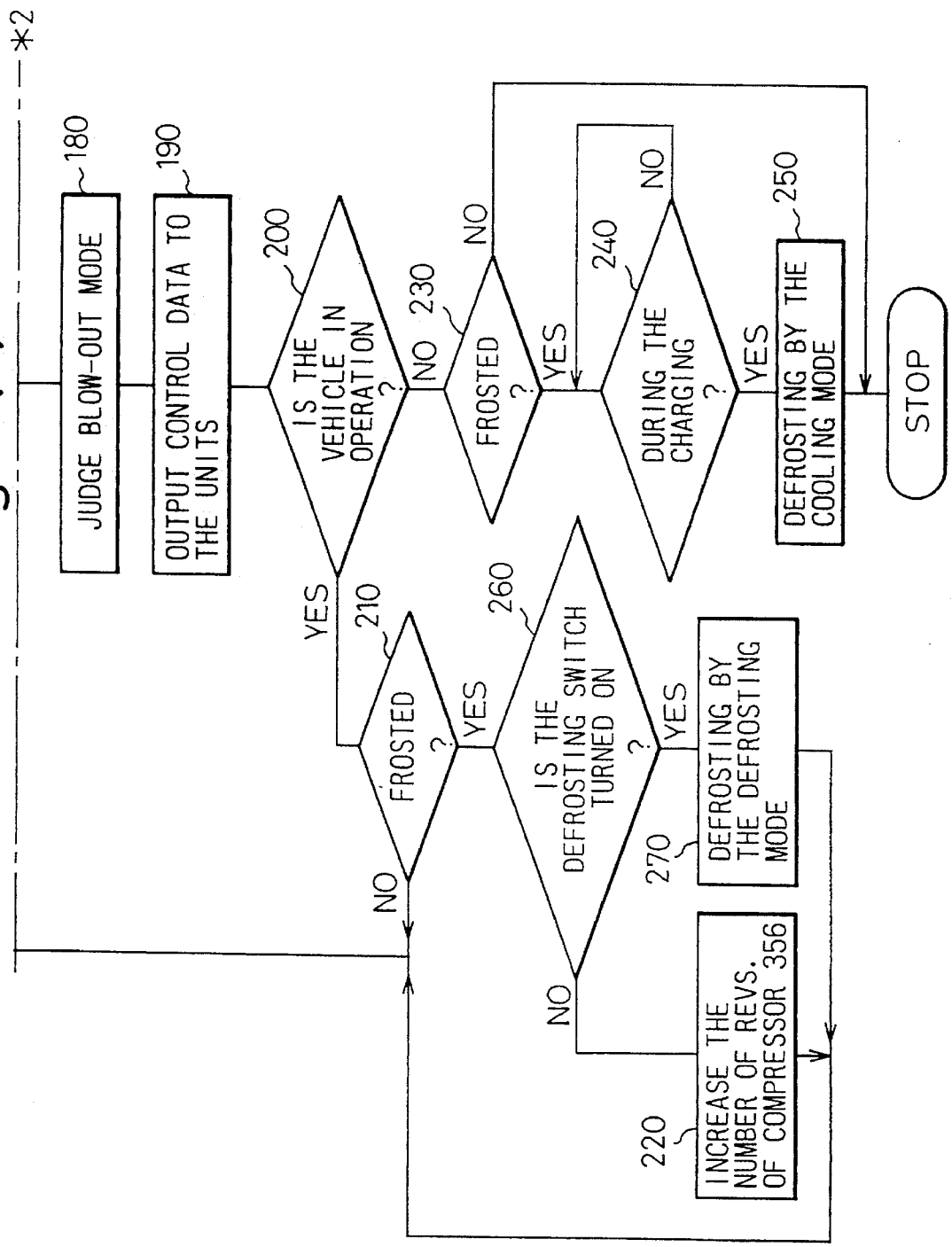

AIR-CONDITIONING DEVICE FOR ELECTRIC AUTOMOBILES

BACKGROUND OF THE INVENTION

1. Field of the Invention

The present invention relates to an air-conditioning device for electric automobiles for cooling and heating the interior of the passenger compartment of a car relying upon a refrigerating system and, particularly, for defrosting the heat exchanger on the outside of the passenger compartment.

2. Description of the Related Art

In general, the air-conditioning device of an electric automobile which is powered by a power source of secondary batteries effects cooling and heating based upon a refrigerating system which also serves as a heat pump. The refrigerating system that also serves as a heat pump comprises an internal heat exchanger installed in a blast duct that sends the air into the passenger compartment and an external heat exchanger for exchanging the heat with the external air that are provided in a coolant circulation circuit together with a compressor wherein, during the cooling operation, a high-temperature gas coolant supplied from the compressor is fed to the external heat exchanger so that the external heat exchanger works as a condenser, and the liquid coolant after having radiated the heat and is condensed is fed to the internal heat exchanger so that the internal heat exchanger works as an evaporator, in order to cool the air that flows through the blast duct utilizing the endothermic action of the internal heat exchanger. During the heating operation, on the other hand, the high-temperature gaseous coolant supplied from the compressor is fed to the internal heat exchanger so that the internal heat exchanger works as a condenser, and the air flowing through the blast duct is heated by the heat-radiating action.

During the heating operation, in this case, the external heat exchanger works as an evaporator. When the heating operation is continued for extended periods of time, therefore, the surfaces of the external heat exchanger become frosted and the heating ability gradually decreases. According to the prior art, therefore, the temperature or the like of the external heat exchanger is detected, presence or absence of the frost is judged based upon the detected value, and the defrosting operation is readily executed when it is judged that frost exists even when the vehicle is in operation. In the defrosting operation, the direction of coolant circulation is changed over to the opposite direction (same direction as during the cooling) to feed the high-temperature gaseous coolant supplied from the compressor to the external heat exchanger, and the frost is removed from the external heat exchanger by the radiation of the heat.

When it is judged that frost exists in the above-mentioned conventional constitution, the defrosting operation is readily assumed even when the vehicle is in operation. As shown in FIG. 7, therefore, the heating ability greatly drops during the defrosting operation; i.e., air of a greatly reduced temperature is blown into the passenger compartment due to the defrosting operation while the vehicle is in operation causing the passengers to feel uncomfortable. In addition, the external heat exchanger receives the cold air when the vehicle is running, whereby an extended period of time is required for the defrosting operation causing the passengers to feel more uncomfortable.

There has further been proposed another defrosting method which effects the defrosting operation while continuing the heating to a small degree by controlling the revolving speed of a coolant compressor in a sophisticated manner by using an inverter.

The passenger compartment of an automobile has a volume which is very small as compared with the ability of the air-conditioning device and, hence, the air blown from the air-conditioning device directly hits the passengers. Therefore, when the defrosting operation is effected by changing the mode to a weak heating, the lukewarm air that is supplied directly hits the passengers to give an uncomfortable feeling during the defrosting operation.

Moreover, the interior of the passenger compartment tends to be cooled very soon after the heating operation is discontinued since it is affected by the air in which the automobile runs and has a small heat-insulating efficiency. Therefore, when the defrosting operation is effected by stopping the heating operation, the interior of the passenger compartment is so cooled that the passengers feel uncomfortable.

The above problem can be solved by heating the air that is blown into the passenger compartment by using an electric heater during the defrosting operation or by developing a method which eliminates the need of effecting the defrosting operation while the passengers are on board.

When the electric heater is used during the defrosting operation, however, the electric power stored in the battery is consumed resulting in a decrease in the mileage which the vehicle is expected to run. Moreover, mounting the electric heater on the air-conditioning device results in an increase in the number of parts and cost for maintaining safety. It is therefore desired to develop technology that requires the defrosting operation as little as possible during the heating operation.

The present invention was accomplished in view of the above-mentioned circumstances, and its object is to provide an air-conditioning device for electric automobiles, which does not permit a drop in the temperature of the blown air that causes an uncomfortable feeling to the passengers despite the fact that the defrosting operation is carried out while the vehicle is in operation, in order to maintain comfortable heating. The present invention further provides an air-conditioning device for electric automobiles, which decreases the number of defrosting operations when the passengers are on board, and effects the defrosting operation without causing an uncomfortable feeling to the passengers as much as possible in the case where the defrosting operation must be effected while the passengers are on board.

SUMMARY OF THE INVENTION

In order to achieve the above-mentioned objects, the present invention employs a technical constitution as described below. That is, according to a first aspect of the present invention, there is provided an air-conditioning device for electric automobiles powered by a power source of secondary batteries, comprising an internal heat exchanger installed in a blast duct that sends air into a passenger compartment; an external heat exchanger for exchanging the heat with the external air; a compressor provided in a coolant circulation circuit that includes the internal heat exchanger and the external heat exchanger, and compresses a coolant; and an electric motor which is rotated by the power source of the secondary batteries to drive the compressor; wherein, during the heating operation, the high-temperature gaseous coolant supplied from said compressor is fed to the internal heat exchanger, so that the internal heat exchanger works as a source of heat. The air-conditioning device for electric automobiles further comprises a frost judging means which judges the formation of frost on the external heat exchanger; wherein, when the frost judging means has detected that frost has formed on the external heat exchanger, the defrosting operation for the external heat exchanger is inhibited while the vehicle is in operation.

According to a second aspect of the present invention, there is provided an air-conditioning device for electric automobiles powered by a power source of secondary batteries, comprising an internal heat exchanger installed in a blast duct that sends air into a passenger compartment; an external heat exchanger for exchanging heat with the external air; a compressor provided in a coolant circulation circuit that includes the internal heat exchanger and the external heat exchanger, and compresses a coolant; and an electric motor which is rotated by the power source of the secondary batteries to drive the compressor; wherein, during the heating operation, the high-temperature gaseous coolant supplied from the compressor is fed to the internal heat exchanger, so that the internal heat exchanger works as a source of heat. The air-conditioning device for electric automobiles further comprises a frost judging means which judges the formation of frost on the external heat exchanger; wherein, when the frost judging means has detected frost formed on the external heat exchanger, the defrosting operation is carried out for the external heat exchanger by a defrosting means having a refrigerating system which includes a function for partly feeding the hot air into the passenger compartment, when said electric automobile is operated.

BRIEF DESCRIPTION OF THE DRAWINGS

FIGS. 1(A) and 1(B) are a flow chart illustrating a control program according to an embodiment of the present invention;

FIG. 4 is a diagram illustrating relationships between the operation modes of the refrigerating system and the operation modes of the external fan;

FIGS. 11(A) and 11(B) are a flow chart explaining the operation of a first defrosting means (first embodiment)

DETAILED DESCRIPTION OF THE PREFERRED EMBODIMENTS

Figure 1B:
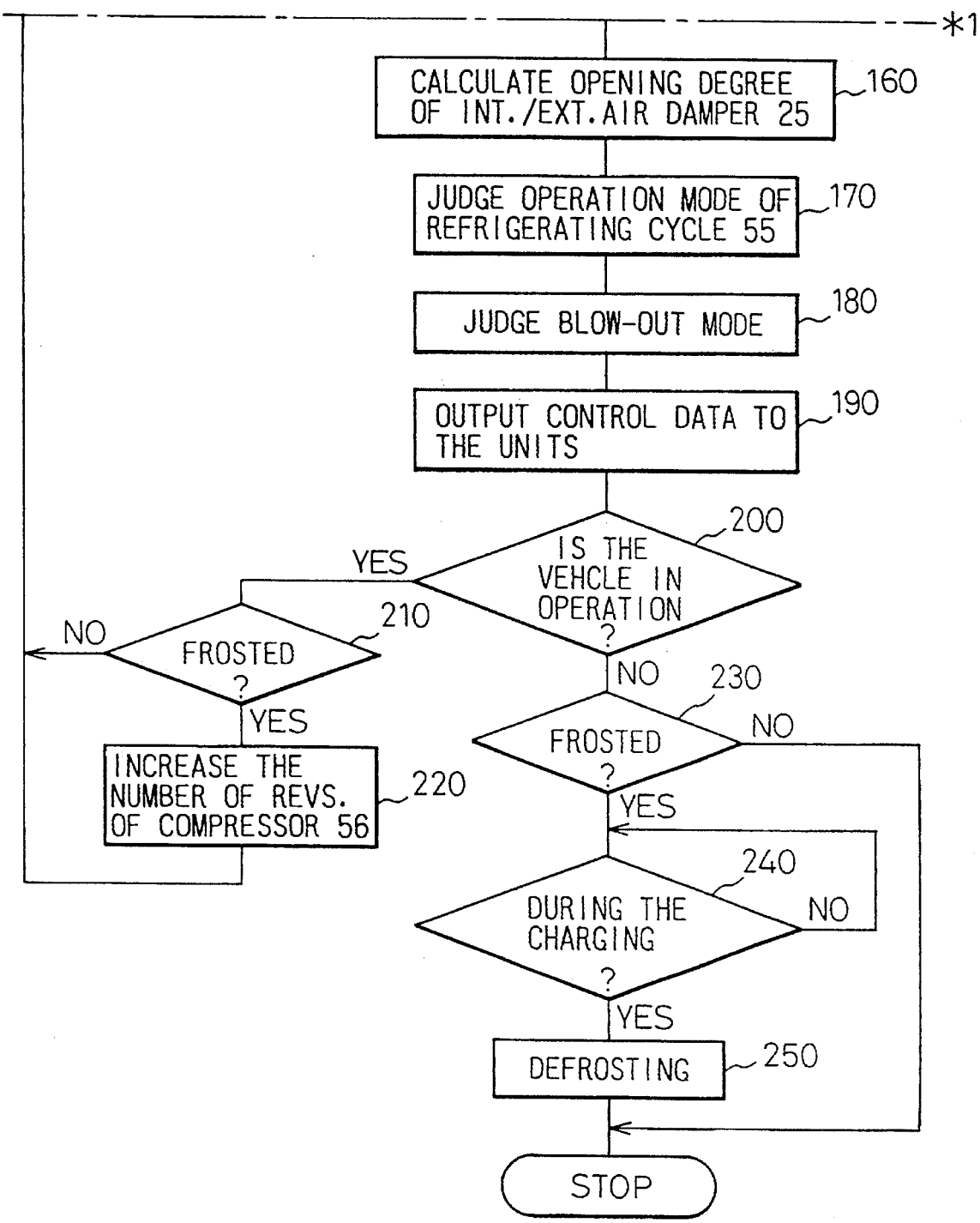

An embodiment of the air-conditioning device for electric automobiles according to the present invention will now be described in detail with reference to the drawings.

First, described below is a first aspect of the air-conditioning device for electric automobiles of the present invention.

That is, the air-conditioning device for electric automobiles according to the first aspect of the present invention has the aforementioned technical constitution, and its basic idea for achieving the above-mentioned object is concerned with an air-conditioning device for electric automobiles powered by a power source of secondary batteries, comprising an internal heat exchanger installed in a blast duct that sends the air into a passenger compartment, an external heat exchanger for exchanging the heat with the external air and a compressor that are provided in a coolant circulation circuit, wherein, during the heating operation, the high-temperature gaseous coolant supplied from the compressor is fed to the internal heat exchanger, so that the internal heat exchanger works as a source of heat, and wherein the defrosting operation for the external heat exchanger is inhibited while the vehicle is in operation but is carried out as required after the operation of the vehicle has finished and while a charging circuit for the secondary batteries is being connected to an external power source for charging.

That is, the conventional electric automobiles have relatively short running spans before the next charging, and the operators of the electric automobiles are accustomed to the need for electrically charging the secondary batteries relatively frequently. In addition, when the heating operation is effected, the electric power of the secondary batteries is discharged more. With these facts in mind, the operators of the electric automobiles do not dare to effect the defrosting operation while the vehicles are in operation. The operation of the vehicles is finished by the time when the amount of the frost becomes a serious problem and the secondary batteries are charged again.

By paying attention to these points according to the first aspect of the present invention, therefore, the heating operation is continued by inhibiting the defrosting operation by a defrosting operation control means when the vehicle is in operation even when the external heat exchanger is frosted during the heating operation. In this case, the temperature of the air that is supplied may gradually decrease due to the frost. However, the amount of the temperature drop is much smaller than that during the defrosting operation, and comfort is not lost.

Then, after the operation of the vehicle is finished and while the charging circuit of the secondary batteries is being connected to the power source for charging, the defrosting operation control means effects the defrosting operation as required. The electric power necessary for the defrosting operation is supplied from the external power source for charging, and the electric power of the secondary batteries is not consumed. According to the second aspect of the present invention, furthermore, if frost is detected while the vehicle is in operation, the defrosting operation which is different from the ordinary defrosting operation is carried out while the vehicle is in operation.

EMBODIMENT 1

The concrete constitution of the air-conditioning device for automobiles according to a first aspect of the present invention will now be described as Example 1 with reference to FIGS. 1 to 6. Referring first to FIG. 2, the constitution of the whole air-conditioning device is briefly described. On the upstream side of a blast case 21 are provided an external air intake port 22 for intaking the air (external air) from the outside of the passenger compartment, and two internal air intake ports 23 and 24 for intaking the air (internal air) from the passenger compartment. An internal air/external air damper 25 is provided at an intermediate position between one internal air intake port 23 and the external air intake port 22, and the opening degree of the internal air/external air damper 25 is adjusted by a servo motor 26 to change the mixing ratio of the air intaken through the external air intake port 22 and the internal air intake ports 23, 24 and to adjust the temperature of the intake air. Blowers 27 and 28 that are blower means are provided on the downstream side of the internal air/external air damper 25 and on the downstream side of the internal air intake port 24, respectively. These two blowers 27 and 28 are mounted on the rotary shaft of a blower motor 29 which is driven by a drive circuit 30.

An evaporator 31 is disposed on the downstream side of the blowers 27 and 28, and the downstream side of the evaporator 31 is divided by a partitioning plate 32 into the two upper and lower vent passages 33 and 34. In the lower vent passage 34 is disposed a condenser 35 which is an internal heat exchanger, and the upper portion of the condenser 35 is protruded into the upper vent passage 33. Over the condenser 35 is disposed a strong-cool damper 36 which is driven by a servo motor 37 to vary the ventilation amount that by-passes the condenser 35. Moreover, a communication damper 38 is disposed at a communication port 32a provided in a partitioning plate 32 on the downstream side of the condenser 35, and is driven by a servo motor 39 to vary the ventilation amount that passes through the communication port 32a of the partitioning plate 32 and to lower the ventilation resistance during a single mode (e.g., "VENT" mode, "DEF" mode, etc.).

On the downstream side of the upper vent passage 33 are provided a defroster blow-out port 40 and a vent blow-out port 41. The vent blow-out port 41 and the defroster blow-out port 40 are provided with dampers 48 and 49, respectively, and the dampers 48 and 49 are driven by servo motors 50 and 51. On the downstream side of the lower vent passage 34 is provided a feet blow-out port 52 for blowing the air onto the feet of the passengers, and a damper 54 driven by a servo motor 53 is provided in the feet blow-out port 52.

The above-mentioned evaporator 31 and the condenser 35 are constituent elements of a refrigerating system 55 which is an air temperature adjusting means and also serves as a heat pump. The refrigerating system 55 is constituted by a compressor 56, a four-way change-over valve 57, an external heat exchanger 58, check valves 59 and 60, a capillary 61, electromagnetic valves 62, 63 and 64, a pressure-reducing valve 65, an accumulator 90, an evaporator 31 and a condenser 35 that are connected together through a pipe. The electromagnetic valves 62, 63 and 64, and the four-way change-over valve 57 are changed over as shown in Table 1 below depending upon the operation mode of the refrigerating system 55.

| Input Operation mode of refrigerating system 55 | | Output | | | |
|---|---|---|---|---|---|
| | | Electromag. valve 62 | Electromag. valve 63 | Electromag. valve 64 | 4-way valve 57 |
| OFF | | OFF | OFF | OFF | OFF (solid line) |
| Cool | | OFF | OFF | OFF | ON (dotted line) |
| Heat | | ON | OFF | OFF | OFF (solid line) |
| Defrost | | OFF | ON | OFF | OFF (solid line) |
| Desiccate | Desiccate H | OFF | OFF | ON | OFF (solid line) |
| | Desiccate C | OFF | ON | OFF | OFF (solid line) |

In the cooling mode as will be obvious from Table 1, the four-way change-over valve 57 is changed over to a position (turn-on position) indicated by a dotted line in FIG. 2, and the coolant supplied from a blow-out port 56a of the compressor 56 circulates through the passage consisting of check valve 59→external heat exchanger 58→capillary 61→evaporator 31→accumulator 90→intake port 56b of compressor 56. The high-temperature gaseous coolant supplied from the blow-out port 56a of the compressor 56 radiates the heat at the external heat exchanger 58 and is liquefied, and the liquid coolant evaporates in the evaporator 31 to cool the air that passes through the evaporator 31.

In the heating mode, on the other hand, the four-way change-over valve 57 is changed over to a position (turn-off position) indicated by solid line in FIG. 2, and the coolant from the blow-out port 65a of the compressor 56 circulates through the passage consisting of condenser 35→pressure-reducing valve 65→check valve 60→external heat exchanger 58→electromagnetic valve 62→accumulator 90→intake port 56b of compressor 56. The high-temperature gaseous coolant supplied from the blow-out port 56a of the compressor 56 radiates the heat at the condenser 35 and is liquefied, and the air passing through the condenser 35 is heated by the heat that is radiated.

In the defrosting mode, the four-way change-over valve 57 is at the position indicated by the solid line in FIG. 2, whereby the electromagnetic valve 63 is opened, the high-temperature gaseous coolant supplied from the blow-out port 56a of the compressor 56 is also fed to the external heat exchanger 58 via the condenser 35 and the electromagnetic valve 63 thereby to remove the frost adhering on the surface of the external heat exchanger 58.

In a desiccating mode H, furthermore, the four-way change-over valve 57 is at the position indicated by the solid line in FIG. 2, whereby the electromagnetic valve 63 is closed, the electromagnetic valve 64 is opened, the liquid coolant fed to the external heat exchanger 58 is further partly fed to the evaporator 31, and the air is desiccated by the evaporator 31. The condenser 35 radiates the heat that was absorbed by the evaporator 31 and the external heat exchanger 58, so that a high blow-out temperature is obtained. In a desiccating mode C, the four-way change-over valve 57 is at the position indicated by the solid line in FIG. 2, whereby the electromagnetic valve 63 is opened, the external heat exchanger 58 also works as a condenser together with the condenser 35, the coolant liquified through both the condenser 35 and the external heat exchanger 58 is fed to the evaporator 31, and the air is desiccated by the evaporator 31. The heat absorbed by the evaporator 31 is radiated by the condenser 35 and the external heat exchanger 58, and the blow-out temperature becomes lower than that of during the desiccation.

Here, the external heat exchanger 58 is provided with an external fan 89 for forced cooling, and a fan motor 89a of the external fan 89 is changed over to high-speed revolution "Hi", low-speed revolution "Lo" and stop "OFF" depending upon the operation mode of the refrigerating system 55 and data output from various sensors as shown in FIG. 4. In the cooling mode, for example, "Hi" is assumed when the external air temperature Tam detected by an external air temperature sensor 78 is higher than 25° C. and "Lo" is assumed when it is lower than 22° C. In the heating mode. On the other hand, "Hi" is assumed when the external air temperature Tam is lower than 13° C. and "Lo" is assumed when it is higher than 16° C. In the desiccating mode H, the motor is stopped "OFF" when the temperature Te of the air just after it has passed through the evaporator 31 (hereinafter referred to as "evaporator outlet temperature") is higher than 4° C., "Hi" is assumed when it is lower than 2° C., and "lo" is assumed over a range of 3° C.→4° C. and a range of 3° C.→2° C. In the desiccating mode C, furthermore, a preferential order of Hi>Lo>OFF is determined depending upon the pressure Pd of the coolant supplied from the compressor 56 detected by a coolant blow-out pressure sensor 88 and upon the temperature Td of the coolant supplied from the compressor 56. For instance, "Hi" is assumed at all times when the blow-out pressure Pd of the coolant is larger than 19 kgf/cm$^2$ irrespective of the value Td.

A motor 66 that drives the compressor 56 of the refrigerating system 55 is driven by an inverter 67 which inverts the DC electric power of, for example, 200 to 300 V supplied from the secondary batteries 92 that constitute the power source for driving the vehicle into the AC electric power and controls the rotational speed of the motor 66 by varying the AC frequency thereof. The secondary batteries 92 are electrically charged by an external power source for charging via a charging circuit 93. The charging circuit 93, inverter 67, servo motors 26, 37, 39, 50, 51 and 53, fan motor 89a of the external fan 89, and drive circuit 30 are controlled by an electronic control unit (hereinafter referred to as "ECU") 68. The ECU 68 is constituted chiefly by a microcomputer and includes a CPU 69, a RAM 70 for temporarily storing a variety of data, a ROM 71 storing a control program of FIG. 1, an A/D converter 72 for converting the input data into digital values, an I/0 unit 73, and a quartz oscillator 74 for generating reference signals of several megahertz, and is served with electric power from a battery 75 via an ignition switch 76.

The ECU 68 reads, via the A/D converter 72, a variety of signals sent from an internal air temperature sensor 77 that detects the internal air temperature Tr, an external air temperature sensor 78 that detects the external air temperature Tam, a solar radiation sensor 79 that detects the amount of solar radiation Ts falling in the passenger compartment, an evaporator outlet temperature sensor 80 that detects the temperature Te at the outlet of the evaporator, a condenser outlet temperature sensor 81 that detects the temperature Tc of the air just after it has passed through the condenser 35 (hereinafter referred to as "condenser outlet temperature"), a coolant blow-out pressure sensor 88 that detects the pressure Pr of the coolant supplied from the compressor 56, a thermal sensation setter 82 using which a passenger manually sets a thermal sensation Sset that is desired, an intake air temperature sensor 46 that detects the temperature Tin of the air (hereinafter referred to as "intake air temperature") taken in by the evaporator 31, and an external heat exchanger temperature sensor 94 that detects the temperature To of the external heat exchanger 58 (of the coolant inside thereof).

Figure 3:
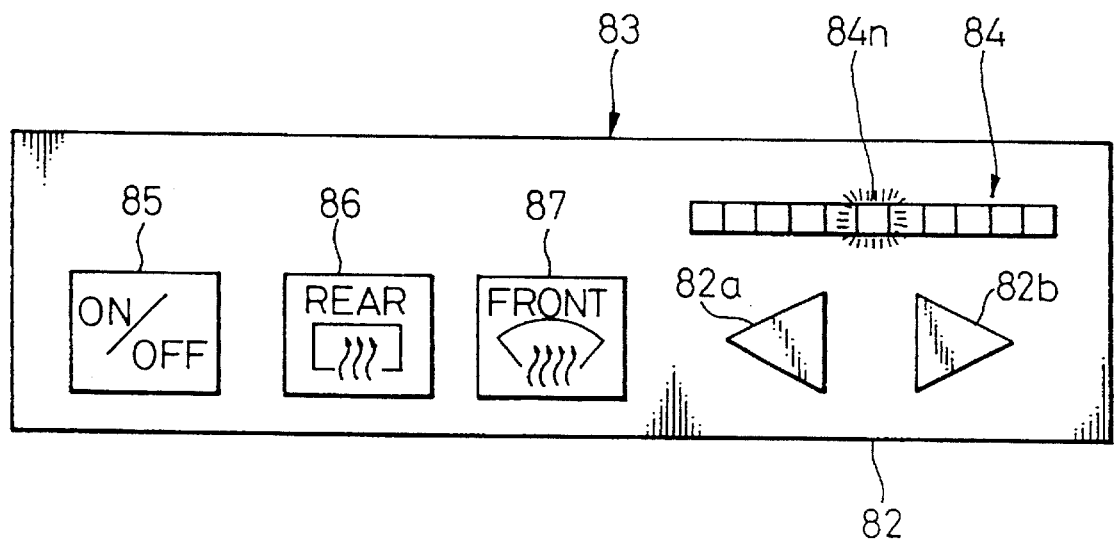
FIG. 3 is a front view of an air control panel.

The thermal sensation setter 82 has a slightly-cool key 82a and a slightly-warm key 82b, and is provided in an air conditioner control panel 83 arranged at the central portion of an instrument panel (not shown) of an automobile. As shown in FIG. 3, the air conditioner control panel 83 has a thermal sensation display portion 84 consisting of a plurality of light-emitting elements 84n that are laterally arranged in line over the thermal sensation setter 82. The thermal sensation display portion 84 displays setpoint thermal sensation Sset that is input by using the slightly-cool key 82a and the slightly-warm key 82b. The setpoint thermal sensation Sset is an indication of how much the temperature is to be cooled down or warmed up with an average temperature of 25° C. as a reference [see FIG. 5(A)]. In the state before the keys 82a and 82b are operated, a central light-emitting element 84n of the thermal sensation display portion 84 is turned on. Every time the slightly-cool key 82a is depressed, the setpoint thermal sensation Sset is shifted down by one rank, i.e., the turn-on position is leftwardly shifted by one. Every time when the slightly-warm key 82b is depressed, on the other hand, the setpoint thermal sensation Sset is raised by one rank, i.e., the turn-on position is rightwardly shifted by one. The air conditioner control panel 83 is further provided with an air conditioner on/off switch 85, a rear defogger switch 86, and a front defroster switch 87.

Figure 2:
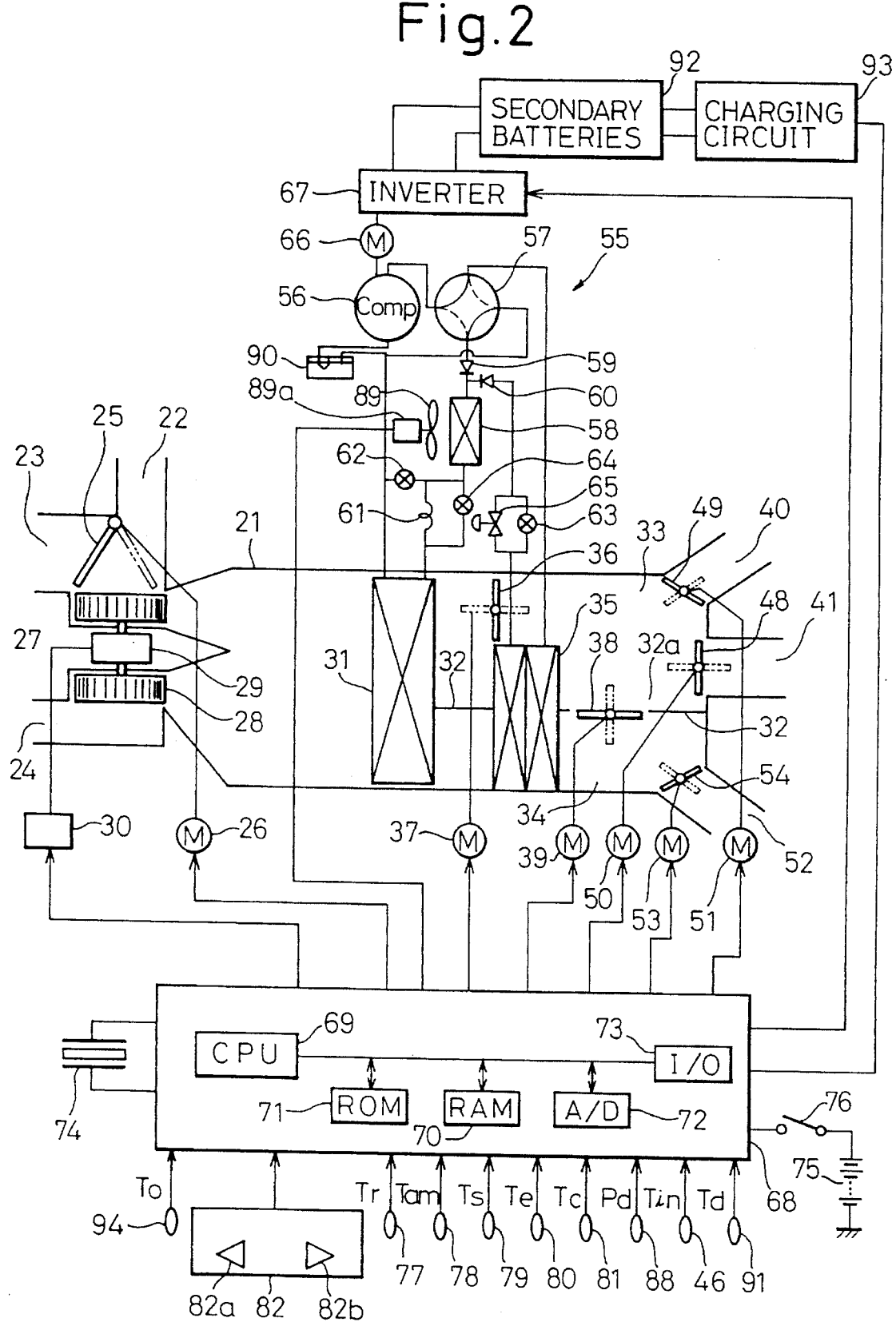
FIG. 2 is a diagram which schematically illustrates the whole constitution of an air-conditioning device.

By executing the control program of FIG. 1, the ECU 68 functions as a defrosting operation control means which inhibits the defrosting operation of the external heat exchanger 58 while the vehicle is in operation, and effects the defrosting operation for the external heat exchanger 58 as required after the operation of the vehicle is finished and while the charging circuit 93 of the secondary batteries 92 is being connected to the external power source for charging.

In the above-mentioned air-conditioning device for electric automobiles according to the first aspect of the present invention, the defrosting operation is not carried out while the automobile is in operation even when the frost judging means has detected the frost formed on the external heat exchanger. In another embodiment of the air-conditioning device for automobiles according to the first aspect of the present invention, when the frost judging means has detected the frost formed on the external heat exchanger, the rotational speed of the compressor is increased instead of carrying out the defrosting operation, so that the compressor exhibits an increased ability for blowing out the coolant.

The above-mentioned control method makes it possible to maintain heating ability of the air-conditioning device for automobiles even when the external heat exchanger is frosted and, hence, to suppress a drop in the temperature of the air that is supplied and maintain comfort.

That is, the ECU 68 works as a frost judging means for judging the formation of frost on the external heat exchanger 58 and may further be used as a compressor operation control means which works to increase the rotational speed of the compressor 56 to increase its ability for blowing out the coolant when it is judged that the external heat exchanger 58 is frosted when the vehicle is in operation.

The contents of control by the ECU 68 will now be described in accordance with the flow chart of FIG. 1. At a step 100, first, the ECU 68 executes the initialization processing to initialize the counters and flags that will be used in the subsequent operation processing. The program then proceeds to a step 110 to read setpoint thermal sensation Sset that is input by manipulating the thermal sensation setter 82, and to read various data from the internal air temperature sensor 77, external air temperature sensor 78, solar radiation sensor 79, evaporator outlet temperature sensor 80, condenser outlet temperature sensor 81, intake air temperature sensor 46, as well as internal air temperature Tr detected by the external heat exchanger temperature sensor 94, external air temperature Tam, amount of solar radiation Ts, evaporator outlet temperature Te, condenser outlet temperature, intaken air temperature Tin and temperature To of the external heat exchanger (coolant).

Figure 5A:
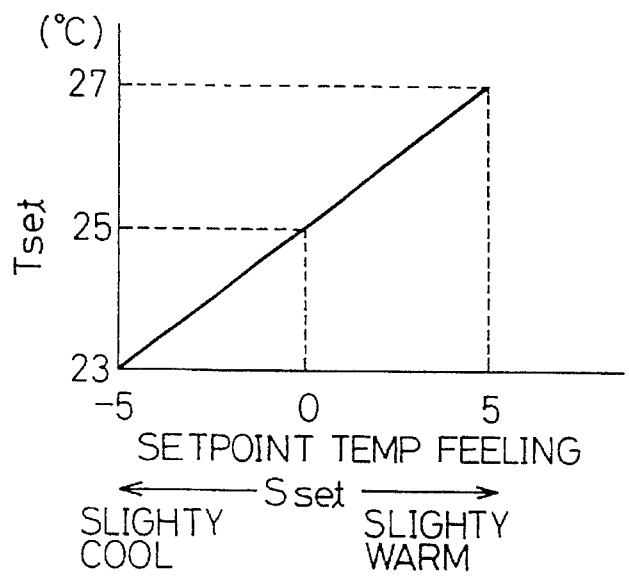
FIG. 5(A) is a diagram illustrating a relationship between the setpoint thermal sensations Sset and Tset'.

The program then proceeds to a step 120 where the setpoint temperature Tset is found from the setpoint thermal sensation Sset, external air temperature Tam and amount of solar radiation Ts in compliance with the following equation (1), $$Tset = f(Sset, Tam, Ts) \quad (1)$$
$$= Tset' + \Delta Tam + \Delta Ts$$

where $Tset'=25+0.4\ Sset$   see FIG. 5(a)

Figure 5B:
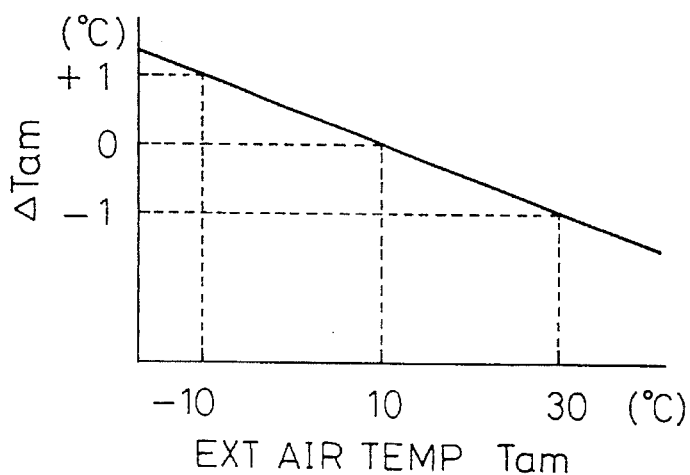
FIG. 5(B) is a diagram illustrating a relationship between the external temperatures Tam and âoTam.

$\Delta Tam=(10-Tam)/20$   see FIG. 5(b)

Figure 5C:
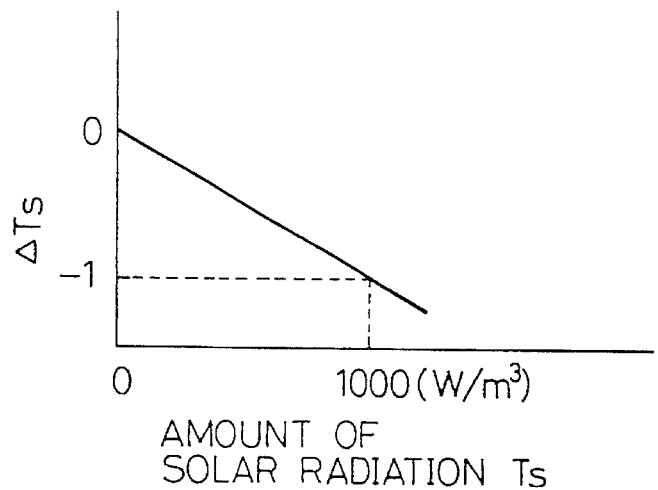
FIG. 5(C) is a diagram illustrating a relationship between the amounts of solar radiation Ts and âoTs.
Figure 6:
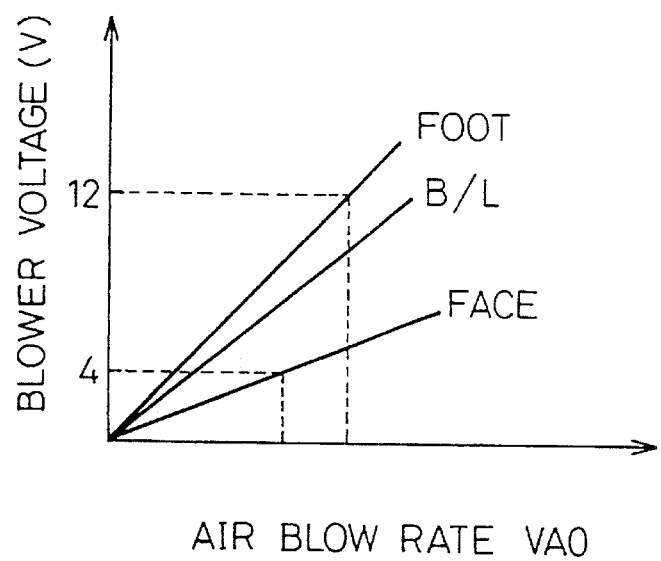
FIG. 6 is a diagram illustrating a relationship between the amount of the air supplied VAO and the blower voltage.
Figure 7:
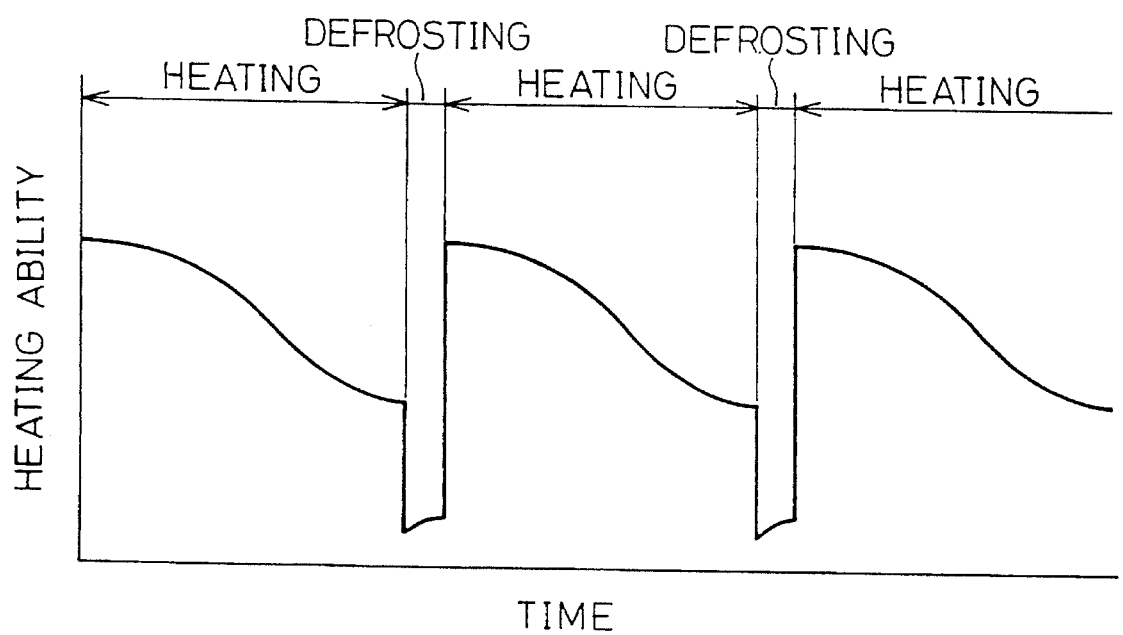
FIG. 7 is a time chart for explaining the drop of heating ability due to the defrosting when a vehicle is in operation according to a prior art.

$\Delta Ts=-Ts/1000$   see FIG. 5(c)

After the setpoint temperature Tset is thus calculated, the program proceeds to a step 130 where the amount of heat QAO necessary for maintaining the interior of the passenger compartment at the setpoint temperature Tset is calculated in compliance with the following equation (2), $$QAO=K1\times Tset-K2\times Tr-K3\times Tam-K4\times Ts+C \quad (2)$$

(K1, K2, K3, K4: coefficients, C: constant)

After the required amount of heat QAO is calculated from the equation (2), the program proceeds to a step 140 to find a combination of the blow-out temperature TAO and the air blow rate VAO that satisfies the following equation (3), $$QAO=Cp\cdot\gamma\cdot VAO(TAO-Tin) \quad (3)$$

where Cp is a specific heat of the air, $\gamma$ is a specific weight of the air, and Tin is the temperature of the air taken in by the evaporator 31.

The program then proceeds to a step 150 to find a maximum air blow rate VAO that satisfies the following thermal sensation evaluation equation (4) out of the combinations of the blow-out temperature TAO and the air blow rate VAO satisfying the above equation (3), and to find a blow-out temperature TAO at that moment.

$$S=k1\{k2+k3(ta-25)-k4(va-3)+k5(St-k6)\}-k7 \quad (4)$$

where,

S: thermal sensation that serves as an indication of comfort in the air-conditioned state, ta: temperature (°C.) of the air stream hitting the passengers, va: velocity (m/s) of the air stream hitting the passengers, St: amount of solar radiation (kcal/m$^2$h) falling on the passengers, k1 to k7: coefficients.

In an electric automobile of this embodiment which places importance on saving the electric power, the value S is selected to be S=−1 to 0 in summer time (cooling mode) and S=+1 to 0 in winter time (heating mode) to accomplish both comfort and saving of power. In the engine-powered automobiles in which the electric power needs not be so strictly saved as in electric automobiles, importance is given to comfort and the value S is selected to be S=−2 in summer time and S=+2 in winter time to obtain the most comfortable conditions.

In this case, the temperature ta of the air stream hitting the passengers can be found from the blow-out temperature TAO and the air blow rate VAO in accordance with the following equation (5), $$\frac{ta}{TAO} = Kt\frac{\sqrt{CA}}{X^m} \quad (5)$$

where Kt is a coefficient determined by the shape of the blow-out port,

C is a coefficient of contracted flow, A is an area of the blow-out port,

X is a distance from the blow-out port to the passenger, and m is an index determined by the shape of the blow-out port.

The velocity va of the air stream hitting the passengers is found from the following equation (6), $$\frac{va}{VAO} = Kv\frac{\sqrt{CA}}{X^n} \quad (6)$$

where Kv is a coefficient determined by the shape of the blow-out port, and n is an index determined by the shape of the blow-out port.

Furthermore, the amount of solar radiation St falling on the passengers can be found from the following equation (7), $$St=Ks\cdot Ts \quad (7)$$

where Ks is a coefficient determined depending upon the characteristics of the solar radiation sensor 79, and Ts is a value output from the solar radiation sensor 79.

By using the above formulas (5) to (7), there can be found a maximum air blow rate VAO that satisfies the thermal sensation evaluation equation (4) and a blow-out temperature TAO at that moment. In this case, in an electric automobile in which importance is placed on saving the electric power as described above, the value S is selected to be S=−1 to 0 in summer time (cooling mode) and S=+1 to 0 in winter mode (heating mode) to accomplish both comfort and saving of electric power. In an engine-powered automobile, on the other hand, the most comfortable conditions are established by selecting the value S to be S=−2 in summer time and S=+2 in winter time. In the aforementioned step 150, therefore, a maximum air blow rate VAO is found within a range that satisfies the above comfort conditions (within a range that does not sacrifice comfort), and a blow-out temperature TAO at that moment is found, too. During the cooling operation, therefore, the blow-out temperature TAO becomes slightly higher than that of the prior art and during the heating operation, the blow-out temperature TAO becomes slightly lower than that of the prior art. The air blow rate VAO becomes slightly greater than that of the prior art during both cooling and heating operations.

After the processing at the step 150 is finished, on the other hand, the program proceeds to a step 160 where the opening degree of the internal air/external air damper 25 is calculated to decrease the difference between the blow-out temperature TAO and the temperature of the air (intake air temperature) Tin taken in through the internal air intake ports 23, 24 and the external air intake port 22. The program then proceeds to a step 170 where it is judged whether the operation mode of the refrigerating system 55 is to be set to either the cooling mode or the heating mode. Then, the program proceeds to a step 180 where the opening degrees of the dampers 36, 38, 48, 49 and 54 are determined based upon the blow-out temperature TAO and the air blow rate VAO found in the step 150, the blow-out mode is determined to be any one of "VENT", "B/L", "FOOT", "FOOT/DEF" or "DEF", and these control data are output to each of the units (step 190).

Next, at a step 200, it is judged whether the vehicle is in operation or not. When the vehicle is in operation (YES), the program proceeds to a step 210 where it is judged whether the external heat exchanger 58 is frosted or not relying upon any one of the following frost judgement references (1) to (4).

Frost judgement reference (1).

External air temperature Tam−external heat exchanger (coolant) temperature To≧setpoint temperature.

Frost judgement reference (2).

External air temperature Tam≦setpoint temperature,

Heating operation time≧setpoint time, and

External air humidity≧setpoint humidity.

Frost judgement reference (3).

External heat exchanger (coolant) temperature To≦setpoint temperature,

Heating operation time≧setpoint time, and

External air humidity≧setpoint humidity.

Frost judgement reference (4).

External air temperature Tam−external heat exchanger (coolant) temperature To≧setpoint temperature, Heating operation time≧setpoint time, and External air humidity≧setpoint humidity.

When the above frost judgement references are satisfied, it is judged at a step 210 that the external heat exchanger is frosted and the program proceeds to a step 220 where the program returns back to the step 110 without starting the defrosting operation program or the rotational speed of the compressor 56 is increased to increase the ability for blowing out the coolant without starting the defrosting operation program. This makes it possible to maintain the heating ability when the external heat exchanger is frosted; i.e., the temperature of the supplied air is suppressed from decreasing to favorably maintain comfort. Thereafter, the program returns back to the step 110 to repeat the processing to control the air-conditioning operation. That is, according to the first aspect of the present invention, the defrosting operation is inhibited when the vehicle is in operation and, depending upon the cases, the rotational speed of the blower is increased. Here, in order to realize the air blow rate VA0 found at the step 150, the blower voltage applied to the blower motor 29 is determined depending upon the voltage characteristics vs. blow-out mode of FIG. 6.

In this case, when the blow-out temperature TA0 necessary for maintaining the interior of the passenger compartment at the setpoint temperature Tset is obtained by mixing the internal air and the external air together, operation of the compressor 56 in the refrigerating system 55 is stopped. When the required blow-out temperature TAO is not obtained from the internal air and the external air only, on the other hand, the compressor 56 is driven by the inverter 67 to operate the refrigerating system 55 in an operation mode that is determined at the step 170. In the cooling mode in this case, the feedback control is carried out based on the PI control or the fuzzy control by making reference to the evaporator outlet temperature Te detected by the evaporator outlet temperature sensor 80 and in the cooling mode, the feedback control is carried out based on the PI control or the fuzzy control by making reference to the condenser outlet temperature Tc detected by the condenser outlet temperature sensor 81.

In another embodiment according to the first aspect of the present invention, the defrosting operation is not carried out when the vehicle is in operation but is carried out at a moment when the operation of the vehicle is stopped. That is, when the ignition switch 76 is turned off to discontinue the operation of the vehicle, the judgement at the step 200 becomes "NO" and the program proceeds to a step 230 where it is judged whether the external heat exchanger 58 is defrosted or not relying upon any one of the above-mentioned frost judgement references (1) to (4). When it is judged at the step 230 that the external heat exchanger 58 is not frosted (NO), the control program is finished without executing the processings of the subsequent steps 240 and 250.

On the other hand, when it is judged at the step 230 that the external heat exchanger 58 is frosted (YES), the program proceeds to the step 240 where it is judged whether the secondary batteries 92 are being electrically charged or not, i.e., whether the charging circuit 93 of the secondary batteries 92 is connected to the external power source for charging or not. When the charging circuit 93 has not been connected (NO), the program waits for until it is connected. After the judgement at the step 240 has turned to "YES", the program proceeds to the step 250 to execute the defrosting operation. While the defrosting operation is being carried out, the four-way change-over valve 57 is at the position indicated by the solid line in FIG. 2, the electromagnetic valve 63 is opened, and the high-temperature gaseous coolant supplied from the blow-out port 56a of the compressor 56 is also fed to the external heat exchanger 58 passing through the condenser 35 and the electromagnetic valve 63. Therefore, the frost adhered on the surfaces of the external heat exchanger 58 is removed by the heat released from the high-temperature gaseous coolant. After the frost is removed from the surfaces of the external heat exchanger 58, the defrosting operation is finished, and the control program is also finished.

Here, the conventional electric automobiles have relatively short running spans before the next charging, and the operators of the electric automobiles are accustomed to the necessity of electrically charging the secondary batteries 92 relatively frequently. In addition, when the heating operation is effected, the electric power of the secondary batteries 92 is discharged more. With these facts in mind, the operators of the electric automobiles do not dare to effect the defrosting operation while the vehicles are in operation. The operation of the vehicles is finished by the time when the amount of the frost becomes a serious problem and the secondary batteries 92 are charged again.

By paying attention to these points according to the embodiment 1, therefore, the heating operation is continued by inhibiting the defrosting operation when the vehicle is in operation even when the external heat exchanger 58 is frosted during the heating operation. In this case, the temperature of the air that is supplied may gradually decrease due to the frost. However, the amount of the temperature drop is much smaller than that of during the defrosting operation, and comfort is not lost.

In addition, in the embodiment 1, when it is judged that the external heat exchanger 58 is frosted while the vehicle is in operation, the rotational speed of the compressor 56 is increased to increase its ability for blowing out the coolant. Therefore, even when the external heat exchanger is frosted to some extent, the heating ability is sufficiently maintained, the temperature of the supplied air is kept from decreasing, and comfort is favorably maintained.

Then, after the operation of the vehicle is finished and while the charging circuit 93 of the secondary batteries 92 is being connected to the external power source for charging, the defrosting operation is carried out as required. The electric power necessary for the defrosting operation is supplied from the external power source for charging, and the electric power of the secondary batteries 92 is not consumed; i.e., the secondary batteries 92 need bear a reduced burden. That is, provision is made of a defrosting operation control means which executes the defrosting operation for the external heat exchanger when it is judged by the judging means that the external heat exchanger is frosted and while the secondary batteries are being electrically connected to the power source for charging.

The defrosting operation may be carried out at any time as long as the charging circuit 93 of the secondary batteries 92 is connected to the external power source for charging. Therefore, the defrosting operation may be started, for example, after the secondary batteries 92 have been electrically charged by about 80% or after the electric charging is completely finished (i.e., after the charging voltage has reached the charge completion voltage).

According to the above-mentioned embodiment, the defrosting operation can be carried out even when the electric motor for driving the compressor is not directly connected to the secondary batteries, for example, even when the electric motor is directly connected to the external power source instead of the secondary batteries.

When the external air temperature Tam is higher than the setpoint temperature after the operation of the vehicle is finished (during the charging), the external heat exchanger is spontaneously defrosted during the charging without the need of effecting the defrosting operation. Therefore, the defrosting operation need not be carried out.

In this embodiment, furthermore, instead of judging that the external heat exchanger is frosted, the fact that the external heat exchanger is not frosted may be judged relying upon that "external air temperature≧setpoint temperature" or "heating operation time≦setpoint time". When the judged result is "NO", the defrosting operation may be carried out during the charging.

According to the present invention, furthermore, the coolant pressure may be used as the data for judging the frost instead of the temperature To of the external heat exchanger (coolant), or the constitution related to the mechanism for blowing the air may be suitably changed without departing from the spirit and scope of the invention.

In the air-conditioning device for electric automobiles according to the first aspect of the present invention, when the frost judging means has detected that the external heat exchanger is frosted, it is desired that the defrosting means having a refrigerating system including a function that feeds the cold air only into the passenger compartment, executes the defrosting operation for the external heat exchanger after the operation of the vehicle has finished. It is further desired that the defrosting means (hereinafter referred to as second defrosting means) circulates the coolant in the order of the compressor, external heat exchanger, decompression device and internal heat exchanger.

According to the air-conditioning device for electric automobiles of the first aspect of the present invention as will be obvious from the foregoing description, the heating operation is continued without effecting the defrosting operation when the vehicle is in operation despite the fact that the external heat exchanger is frosted during the heating operation, and the defrosting operation is carried out as required after the operation of the vehicle is finished and while the charging circuit of the secondary batteries is being connected to the external power source for charging. It is therefore made possible to prevent the temperature of the supplied air from being decreased by the defrosting operation that causes an uncomfortable feeling for the passengers while the vehicle is in operation, to avoid the loss of comfort and to obtain the electric power necessary for the defrosting operation from the external power source for charging. Thus, the electric power of the secondary batteries is not used for the defrosting operation, and reduced burden is born by the secondary batteries.

When it is judged that the external heat exchanger is frosted, furthermore, the ability of the compressor for blowing out the coolant is increased to sufficiently maintain the heating ability despite the external heat exchanger is frosted to some extent, and a decrease in the temperature of the supplied air is suppressed to more favorably maintain comfort.

EMBODIMENT 2

A concrete example of the air-conditioning device for electric automobiles according to a second aspect of the present invention will be described next as a second embodiment with reference to FIGS. 8 to 11. In the air-conditioning device for electric automobiles according to the second aspect of the present invention, the defrosting operation is carried out even when the vehicle is in operation. That is, according to a second aspect of the present invention, there is provided an air-conditioning device for electric automobiles powered by a power source of secondary batteries, comprising an internal heat exchanger installed in a blast duct that sends the air into a passenger compartment, an external heat exchanger for exchanging the heat with the external air, a compressor provided in a coolant circulation circuit that includes the internal heat exchanger and said external heat exchanger and compresses a coolant, and an electric motor which is rotated by the power source of the secondary batteries to drive the compressor, wherein, during the heating operation, the high-temperature gaseous coolant supplied from the compressor is fed to the internal heat exchanger, so that the internal heat exchanger works as a source of heat, the air-conditioning device for electric automobiles further comprising a frost judging means which judges the formation of frost on the external heat exchanger, wherein, when the front judging means has detected the frost formed on the external heat exchanger, the defrosting operation is carried out for the external heat exchanger by a defrosting means (hereinafter referred to as first defrosting means) having a refrigerating system which includes a function for partly feeding the hot air into the passenger compartment. Here, the first defrosting means circulates the coolant in the order of the compressor, internal condenser installed in the blast duct for blowing the air into the passenger compartment, external heat exchanger, decompression device and internal heat exchanger.

In another concrete example according to the second aspect of the present invention, the air-conditioning device for electric automobiles may be provided with the above-mentioned first defrosting operation means and a second defrosting operation means, and whether the defrosting operation is to be effected while the vehicle is in operation or after the operation of the vehicle is finished is arbitrarily selected by the passenger.

Concretely, the air-conditioning device for electric automobiles comprises a running motor which generates output for running the vehicle, batteries for feeding electric power to the running motor, charging means for electrically charging the batteries, a duct for sending the air into the passenger compartment, a blower for producing the air stream in the duct to send the air into the passenger compartment, a heat pump-type refrigerating system including an internal condenser that is disposed in the duct and heats the air blown into the passenger compartment, an internal evaporator that cools the air blown into the passenger compartment, an external heat exchanger for exchanging the heat between the external air and the coolant, a coolant compressor which intakes and compresses the coolant, and a coolant flow change-over means which effects the cooling operation, heating operation or desiccating operation by changing over the direction of the coolant flow, and a control unit which controls the blower and the refrigerating system, wherein the control unit is provided with a first defrosting means which defrosts the external heat exchanger by circulating the coolant in the order of the coolant compressor, the internal condenser, the external heat exchanger, the decompressing device and the internal evaporator, and a second defrosting means which defrosts the external heat exchanger by circulating the coolant in the order of the coolant compressor, the external heat exchanger, the decompressing device and the internal evaporator.

The first defrosting means is used when the passengers are on board, and the second defrosting means is used when the passengers are not on board such as during the charging.

According to the above-mentioned constitution of the present invention, the coolant is circulated in the order of the coolant compressor, internal condenser, external heat exchanger, decompression device, internal evaporator and coolant compressor (first defrosting means) when the external heat exchanger is to be defrosted while the passengers are on board. That is, the coolant of a high temperature and high pressure compressed by the coolant compressor is cooled by the internal condenser. The coolant, however, has the heat in an amount sufficient for melting the frost formed on the external heat exchanger which is a next part of the circulation path, and the external heat exchanger is defrosted by the heat of the coolant. Then, the internal condenser works as a heater and the heated air is sent into the passenger compartment.

The electric automobile has a relatively short running time, and the charging of the batteries and the running are repeated is cycles. When the batteries are charged, the coolant is circulated in the order of the coolant compressor, external heat exchanger, decompression device, internal evaporator and coolant compressor (second defrosting means). That is, the coolant having a high temperature and a high pressure compressed by the coolant compressor is sent into the external heat exchanger that is frosted to melt the frost formed thereon. By effecting the defrosting operation during the charging as described above, the time interval until the external heat exchanger is frosted can be lengthened after the charging has been completed. That is, the external heat exchanger is less likely to be frosted while the passengers are on board.

In another concrete example according to the second aspect of the present invention, provision is made of an indicator means which indicates to the passenger the formation of frost when it is judged by said frost judging means that the external heat exchanger is frosted when the vehicle is in operation, and provision is further made of a defrosting operation start means which selectively starts the defrosting operation when the vehicle is in operation based upon the indication of the above indicator means.

According to the above-mentioned constitution of the present invention, the air-conditioning device for electric automobiles effects the defrosting operation during the period of charging, so that the external heat exchanger is hardly frosted while the passengers are on board. That is, the number of times of the defrosting operation is decreased while the passengers are on board, so that the passengers will feel little discomfort.

Even when the defrosting operation is effected while the passengers are on board, the warm air heated to a small degree is blown into the passenger compartment, so that the passengers will feel as little discomfort as possible.

The air-conditioning device for electric automobiles according to the second aspect of the present invention will now be described as a second embodiment with reference to FIGS. 8 and 9.

Figure 8:
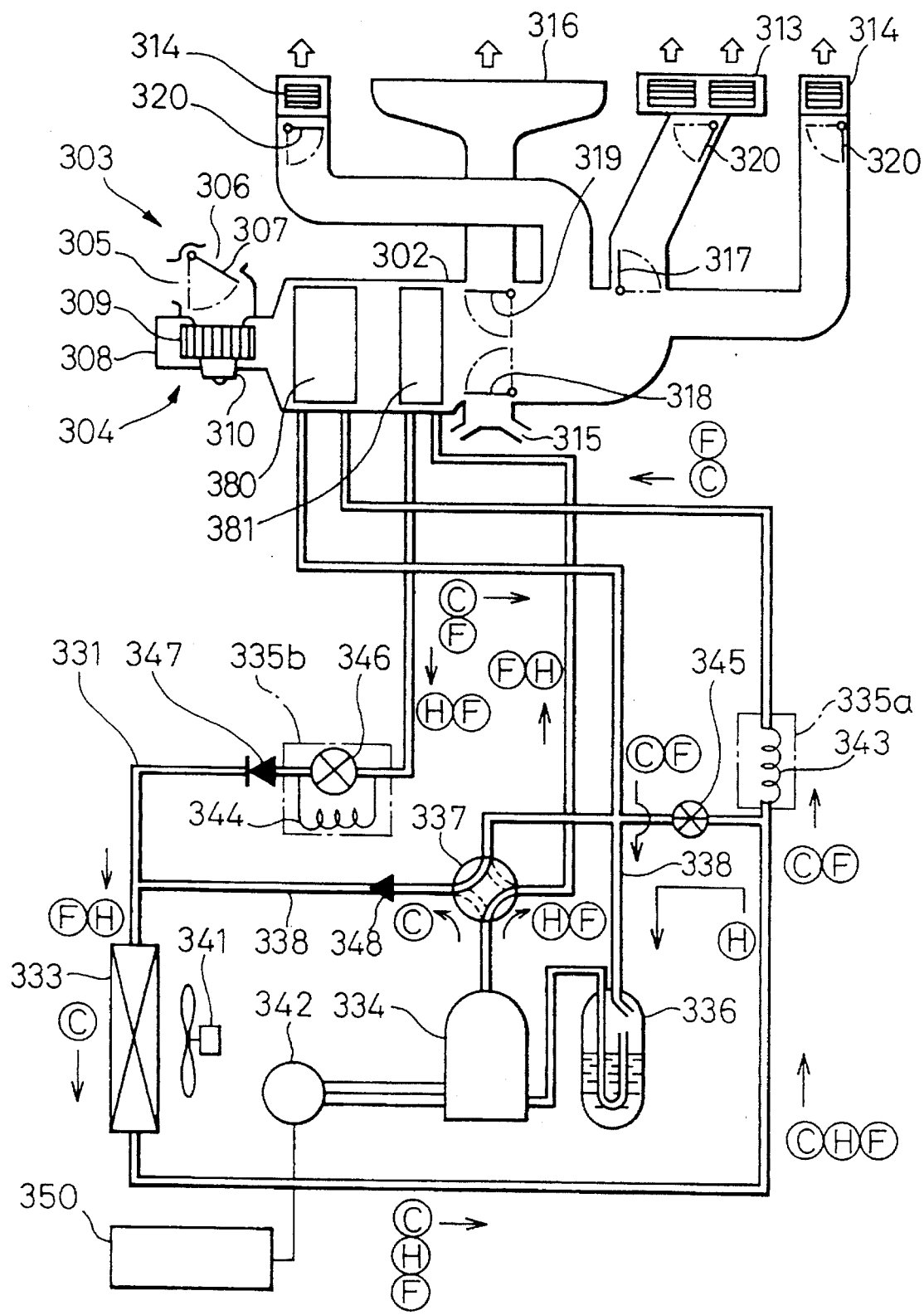
FIG. 8 is a diagram which schematically illustrates the constitution of an air-conditioning device for vehicles (first embodiment)

FIG. 8 illustrates the second embodiment of the present invention, i.e., illustrates the constitution of the air-conditioning device for electric automobiles equipped with an internal unit and a coolant circuit of a refrigerating system.

The internal unit 301 has a duct 302 that forms an air passage for sending the air into the passenger compartment. The duct 302 is arranged in the passenger compartment, and to one end (upstream side) of the duct 302 are connected an internal air/external air change-over means 303 and a blower unit 304.

The internal air/external air change-over means has an internal air introduction port 305 which is communicated with the interior of the passenger compartment and introduces the air (internal air) from the passenger compartment and an external air introduction port 306 which is communicated with the exterior of the passenger compartment and introduces the air (external air) from the outside of the passenger compartment. The internal air/external air change-over means 303 is equipped with an internal air/external air change-over damper 307 by which the internal air or the external air is introduced into the duct 302.

The blower unit 304 is constituted by a fan case 308, a fan 309, and a motor 310. Being supplied with an electric current, the motor 310 rotates the fan 309 to send the internal air or the external air into the passenger compartment through the duct 302.

At the other end (downstream side) of the duct 302 is formed a blow-out port from where the air that is sent through the duct 302 is blown to every portion in the passenger compartment. The blow-out port includes a center face blow-out port 313 for blowing out chiefly the cold air to the upper half body of a passenger from the center at the front portion in the passenger compartment, side-face blow-out ports 314 for blowing out chiefly the cold air to the upper half body of the passenger or to the side window panes from both sides at the front portion in the passenger compartment, feet blow-out ports 315 for blowing out chiefly the hot air to the feet of the passengers, and a defroster blow-out port 316 for blowing out chiefly the hot air to the window pane. In the duct 302 are further provided a center face damper 317, a foot damper 318 and a defroster damper 319 for controlling the air streams sent through the air passages to the blow-out ports except for the side-face blow-out ports 314. At the center face blow-out port 313 and at the side-face blow-out ports 314 are provided open/close dampers 320 that can be operated by hand to adjust the air blow rate depending upon the preferrence of the passenger.

Inside the duct 302 and on all surfaces of the air passage are provided an internal evaporator 380 and an internal condenser 381 which are constituent elements of a refrigerating system 331 that exchanges the heat between the coolant (serving as a cooling source or a heating source) passing therethrough and the air.

The refrigerating system 331 is a heat pump-type refrigerating system which effects the cooling and heating in the interior of the passenger compartment using the internal evaporator 380 and the internal condenser 381, and further includes, in addition to the above-mentioned internal evaporator 380 and the internal condenser 381, an external heat exchanger 333, a coolant compressor 334, a first decompression device 335a, a second decompression device 335b, an accumulator 336 and a four-way valve 337 for changing over the flow direction of the coolant (coolant flow changeover means of the invention) that are connected together through a coolant pipe 338.

The external heat exchanger 333 exchanges the heat between the coolant and the air on the outside of the passenger compartment on the outside of the duct 302, and is provided with an external fan 341 and is located at a position where it is exposed to the wind that is produced as the vehicle runs.

The coolant compressor 334 intakes, compresses and blows out the coolant, and is driven by an electric motor that is not shown. The coolant compressor 334 is arranged together with, for example, an electric motor in a unitary structure in a sealed case. The revolving speed of the electric motor continuously changes being controlled by an inverter 342. By continuously changing the revolving speed of the electric motor, the amount of the coolant supplied from the coolant compressor is continuously changed.

A first decompression device 335a is constituted by a capillary tube 343 for cooling and is inserted in a portion of the coolant pipe 338. The capillary tube 343 for cooling permits the coolant that flows into the internal evaporator from the external heat exchanger 333 to expand under reduced pressure. Moreover, an electromagnetic valve 345 for changing over the direction of coolant flow is inserted in the coolant pipe 338 that connects the capillary tube 343 for cooling to the four-way valve 337.

A second decompression device 335b is constituted by a capillary tube 344 for heating and is inserted in a portion of the coolant pipe 338. The capillary tube 344 for heating permits the coolant that flows into the external heat exchanger 333 from the internal condenser 381 to expand under reduced pressure. Furthermore, the capillary tube 344 for heating is provided with an electromagnetic valve 346 in parallel therewith. The electromagnetic valve 346 works to by-pass the capillary tube 344 during the defrosting operation. Moreover, a one-way valve 347 is provided in the coolant pipe 338 that connects the electromagnetic valve 346 to the external heat exchanger 333, so that the coolant will not flow into the internal condenser 381 during the cooling.

The accumulator 336 works to store an excess of the coolant in the refrigerating system 331, and sends the gaseous-phase coolant to the coolant compressor 334, so that the liquid coolant will not be taken in by the coolant compressor 334.

The four-way valve 337 changes over the flow direction of the coolant, so that the external heat exchanger 333 is connected to the evaporator or the condenser. The four-way valve 337 changes over the flow of the coolant depending upon the cooling operation, heating operation and defrosting operation (defrosting operation based on the internal defrosting method, that will be described later, or the defrosting operation based on the external defrosting method).

During the cooling operation, the coolant supplied from the coolant compressor 334 is supplied in the order of four-way valve 337→external heat exchanger 333→capillary tube 343 for cooling→internal evaporator 380→accumulator 336→coolant compressor 334 (see arrows C in the drawing).

During the heating operation, the coolant supplied from the coolant compressor 334 is supplied in the order of four-way valve 337→internal condenser 381→capillary tube 344 for heating→external heat exchanger 333→accumulator 336→coolant compressor 334 (see arrows H in the drawing).

During the defrosting operation, the coolant supplied from the coolant compressor 334 is supplied in the order of four-way valve 337→internal condenser 381→electromagnetic valve 346→external heat exchanger 333→capillary tube 343 for cooling→internal evaporator 380→accumulator 336→coolant compressor 334 (first defrosting means, see arrows F in the drawing).

Moreover, as in the cooling operation, the coolant supplied from the coolant compressor 334 is supplied in the order of four-way valve 337→external heat exchanger 333→capillary tube 343 for cooling→internal evaporator 380→accumulator 336→coolant compressor 334 (second defrosting means, see arrows C in the drawing).

Figure 9:
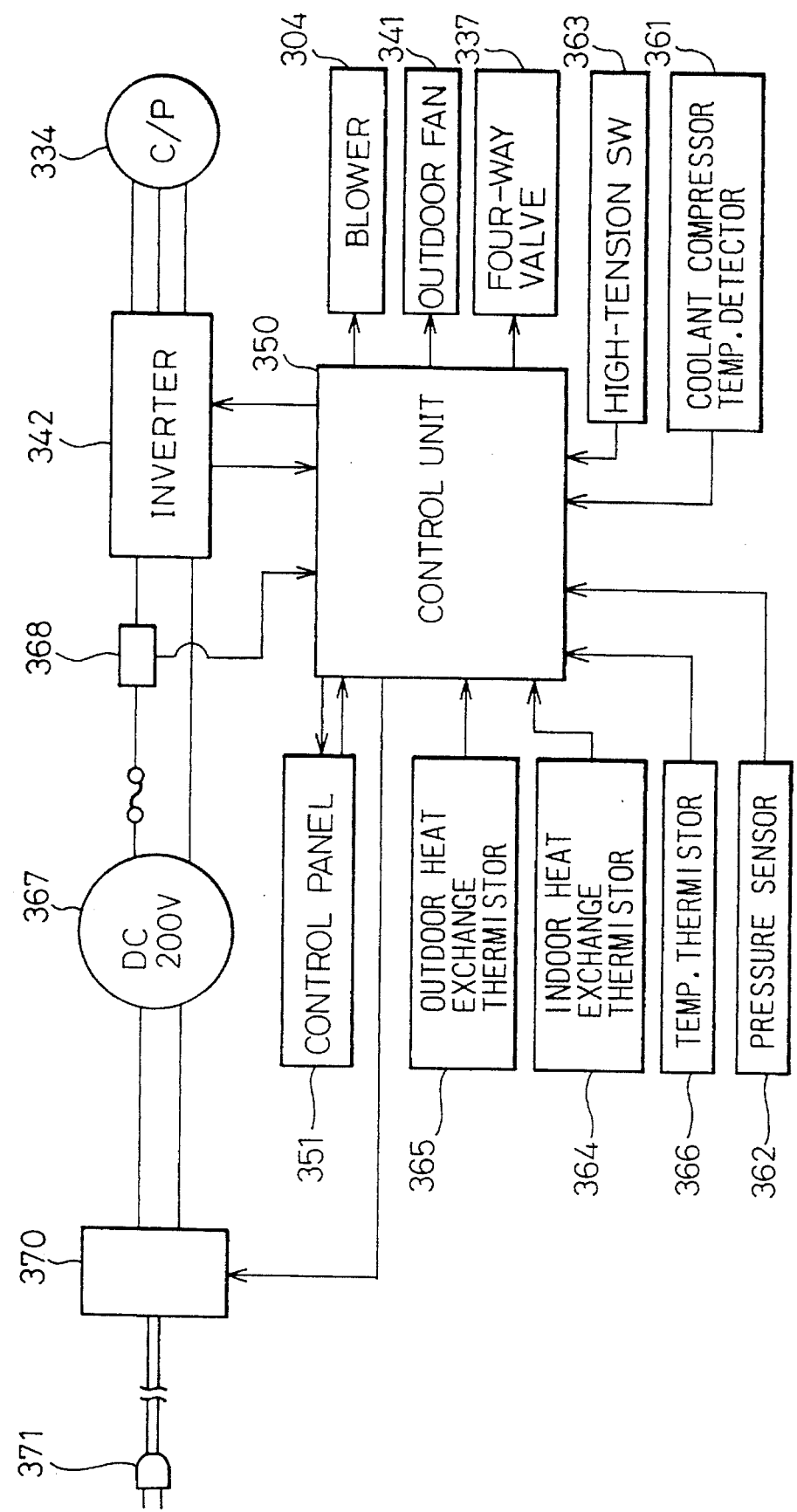
FIG. 9 is a block diagram of a control device (first embodiment)

Electric parts such as actuators (not shown) for driving the blower 304, four-way valve 337, inverter 342, internal fan 341 and dampers are electrically controlled by a control unit 350 that is shown in FIG. 9. The control unit 350 electrically controls the electric parts depending upon the operation signals from a control panel 351 manipulated by the passenger and upon various signals from the sensors, and the control panel 351 is installed at a position where it can be easily manipulated.

Figure 10:
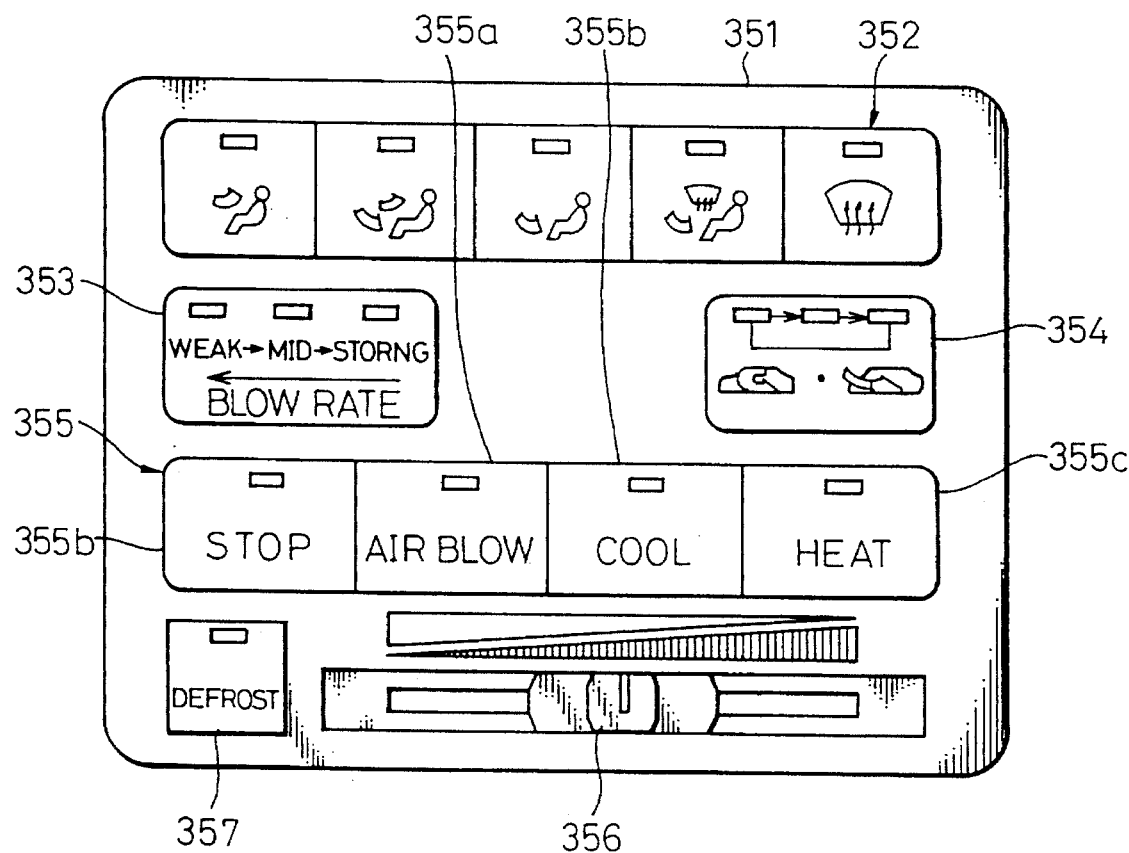
FIG. 10 is a plan view of an operation panel (first embodiment)

As shown in FIG. 10, the control panel 351 is equipped with a group of blow-out mode change-over switches 352 for setting the blow-out modes, an air blow rate-setting switch 353 for setting the rate of the air blown into the passenger compartment through the duct 302, an internal air/external air setting switch 354 for setting the internal air and the external air, a group of air-conditioning mode-setting switches 355 for setting the air-conditioning modes and for instructing the stop of operation, a temperature adjusting lever 356 for setting the rotational speed of the coolant compressor 334 depending upon the air-conditioning mode and the setpoint position, and a defrosting switch 357 which when depressed by hand instructs the start of defrosting operation.

The group of air-conditioning mode-setting switches 355 include an air blow switch 355a for instructing the start of the air blow mode, a cooling switch 355b for instructing the start of the cooling mode, a heating switch 355c for instructing the start of the heating mode, and a stop switch 355d for instructing the stop of operation of these operation modes.

Furthermore, the sensors for sending the signals to the control unit 350 include a coolant compressor temperature detector 361 for detecting the temperature of the coolant compressor 334, a pressure sensor 362 for detecting the blow-out pressure of the coolant compressor 334, a high-pressure switch 363 that will be turned on when the coolant pressure on the blow-out side of the coolant compressor 334 becomes higher than a setpoint value, an internal heat exchange thermistor 364 for detecting the temperature of the internal heat exchanger 332, an external heat exchanger thermistor 365 for detecting the frost formed on the external heat exchanger 333, a temperature thermistor 366 for detecting the temperature in the passenger compartment, and a current detector 368 for detecting a current value fed to the inverter 342 from the batteries 367 of DC 200 V which constitute the power source of the electric automobile.

The batteries supply the electric power to the running motor (not shown) that generates rotational output for running the vehicle. The batteries 367 are equipped with a charging device 370 (charging means) for replenishing the electric power that is consumed by running. The charging device 370 has a plug 371 that will be connected to the power source (electric power station or commercial power source). By connecting the plug 371 to the power source, the batteries 367 are electrically charged.

The control unit 350 monitors whether the batteries 367 are being electrically charged or not. The control unit 350 further monitors whether the key switch that is not shown is turned on or not.

When the key switch is turned off or when the batteries 367 are being charged, the control device 350 so judges that the passengers are not on board. The control unit 350 judges that the passengers are on board when the key switch is turned on.

The control unit 350 is made up of a computer and in which is programmed the defrosting means for defrosting the external heat exchanger 333. The defrosting means in this embodiment includes a first defrosting means for defrosting the external heat exchanger 333 by blowing the weakly heated air into the passenger compartment when the passengers are on board (when the key switch is turned on in this embodiment), and a second defrosting means which defrosts the external heat exchanger 333 by blowing out the cold air into the passenger compartment when the passengers are not on board (when the key switch is turned off and the batteries are being charged).

FIG. 8 illustrates the flow of the coolant (see arrows F in the drawing) when the external heat exchanger 333 is defrosted while the passengers are on board.

The coolant of a high temperature and a high pressure compressed by the compressor 334 is sent to the internal condenser 381 through the four-way valve 337. The high-temperature high-pressure coolant sent to the internal condenser 381 is then sent to the electromagnetic valve 346 (which is opened). The high-temperature high-pressure coolant sent to the electromagnetic valve 346 passes through the one-way valve 347 and is sent to the external heat exchanger 333. The high-temperature high-pressure coolant sent to the external heat exchanger 333 melts the frost formed on the external heat exchanger 333.

Next, the coolant is sent to the capillary tube 343 for cooling where it is rapidly expanded into a mist of a low temperature and a low pressure. The low-temperature low-pressure coolant is sent to the internal evaporator 380 where it absorbs the heat from the surrounding air of a high temperature and is vaporized, and is sent in the form of a gaseous coolant into the accumulator 336. The accumulator stores an excess of the coolant in the refrigerating system 31 and sends the gaseous-phase coolant to the coolant compressor 34.

Here, the blower 304 is weakly operating and is weakly sending the air stream to the internal evaporator 380 and the internal condenser 381 located on the downstream side. Therefore, the air blown by the blower 304 is cooled by the internal evaporator 380 but is heated by the internal condenser 381, whereby the air that is weakly heated is blown into the passenger compartment. The external fan 341 is at rest so that the frost formed on the external heat exchanger 333 is efficiently removed.

The defrosting operation using the indicator means shown in FIG. 10 will now be described.

Referring to FIG. 10, when it is judged by the frost judging means that the external heat exchanger is frosted while the vehicle is in operation, an indicator in the defrosting switch 357, for example, flashes to inform the driver of the formation of the frost. When the driver judges that defrosting is necessary and depresses the defrosting switch 357, the defrosting operation mode is assumed and the operation is carried out for defrosting the external heat exchanger. On the other hand, when the driver judges that the defrosting is not necessary and does not depress the defrosting switch 357, the heating operation is continued and the defrosting operation is carried out during the period of charging in accordance with the flow chart of FIG. 11. That is, the defrosting operation is unnecessarily carried out while the vehicle is in operation, and the passengers need not feel the blown-out air uncomfortable. Since the defrosting operation is carried out during the period of charging, the external heat exchanger will have been defrosted completely by the time the vehicle is used next time and the heating performance can be exhibited to a sufficient degree.

Operation of the first defrosting means according to this embodiment will now be described with reference to a flow chart shown in FIG. 11.

In the flow chart of FIG. 11, the steps 100 to 240 are the same as those of the flow chart of FIG. 1 and are not described here. That is, when the heating operation is selected when the vehicle is in operation (start), it is judged whether the external heat exchanger 333 is frosted or not (step 210). The formation of frost is judged by a widely known frost detecting method such as when the temperature of the external heat exchanger 333 has dropped, for example, below a predetermined temperature (e.g., −5° C.). When the formation of frost is detected, the lamp in the defrosting switch 357 is turned on.

When the judged result at the step 210 is YES, it is then judged whether the defrosting switch 357 is turned on or not by the passenger (step 250). When the judged result at the step 260 is YES, the program proceeds to a step 270 and the defrosting operation is carried out by the defrosting operation mode. When the judged result at the step 260 is NO, the program proceeds to a step 220 where the rotational speed of the compressor 356 is increased to increase the heating ability.

When the defrosting operation is finished (e.g., when the temperature of the external heat exchanger 333 is raised to a predetermined temperature (e.g., 10° C.) or when the defrosting time exceeds a predetermined period of time (e.g., 10 minutes)) at the step 270, the program then returns.

When the judged result is NO at the step 210, the program returns doing nothing.

Then, when the ignition switch 76 shown in FIG. 2 is turned off to finish the operation of the vehicle, the judged result at a step 200 becomes "NO" and the program proceeds to a step 230 where it is judged whether the external heat exchanger 358 is frosted or not relying upon any one of the aforementioned frost judgement references (1) to (4). When it is judged at the step 230 that no frost is formed (NO), the control program is finished without executing the processes of the subsequent steps 240 and 250.

On the other hand, when it is judged at the step 230 that the frost is formed (YES), the program proceeds to a step 240 where it is judged whether the secondary batteries 92 shown in FIG. 2 are being electrically charged or not, i.e., whether the charging circuit 93 of the secondary batteries 92 shown in FIG. 2 is connected to the external power source for charging or not. When the charging circuit 93 has not been connected (NO), the program waits until it is connected. At a moment when the judgement at the step 240 becomes "YES", the program proceeds to a step 250 and the defrosting operation is executed by the cooling mode. While the defrosting operation is being executed, the four-way change-over valve 57 of FIG. 2 is at the position indicated by the solid line in FIG. 2, the electromagnetic valve 63 is opened, the high-temperature gaseous coolant supplied from the supplying port 6a of the compressor 56 is also fed to the external heat exchanger 58 via the condenser 35 and the electromagnetic valve 63, and the frost adhered on the surfaces of the external heat exchanger 58 is removed by the heat released from the high-temperature gaseous coolant. After the frost is removed from the surfaces of the external heat exchanger 58, the defrosting operation is finished, and the control program is also finished.

Described below is the operation of the second defrosting means according to this embodiment.

FIG. 8 illustrates the flow of the coolant (indicated by arrows C) when the defrosting operation is carried out by blowing the cold air into the passenger compartment in a state where the passengers are not on board (key switch is turned off, batteries are being charged).

The coolant flows in the same way as during the cooling operation. The high-temperature high-pressure coolant compressed by the compressor 334 is sent into the external heat exchanger 333 passing through the four-way valve 337 and the one-way valve 348. The high-temperature high-pressure coolant sent to the external heat exchanger 333 melts the frost adhered to the external heat exchanger 333. The coolant is then sent into the capillary tube 343 for cooling where it is allowed to suddenly expand into a mist of a low temperature and a low pressure. The low-temperature low-pressure coolant is fed to the internal evaporator 380 in which it evaporates by absorbing the heat from the surrounding air having a high temperature and is then sent in the form of a gaseous coolant to the accumulator 336 which stores an excess of the coolant in the refrigerating system 331 and sends the gaseous-phase coolant to the coolant compressor 334.

Here, no passenger is on board while the second defrosting means is being carried out and there is no problem even though the cold air is blown into the passenger compartment. In the second defrosting method according to this embodiment, therefore, the external heat exchanger 333 is used as a condenser and the blower 304 is actuated. The external fan 341 is at rest to remove the frost adhered on the external heat exchanger 333. Thus, the external heat exchanger 333 is defrosted at a maximum efficiency.

Figure 12:
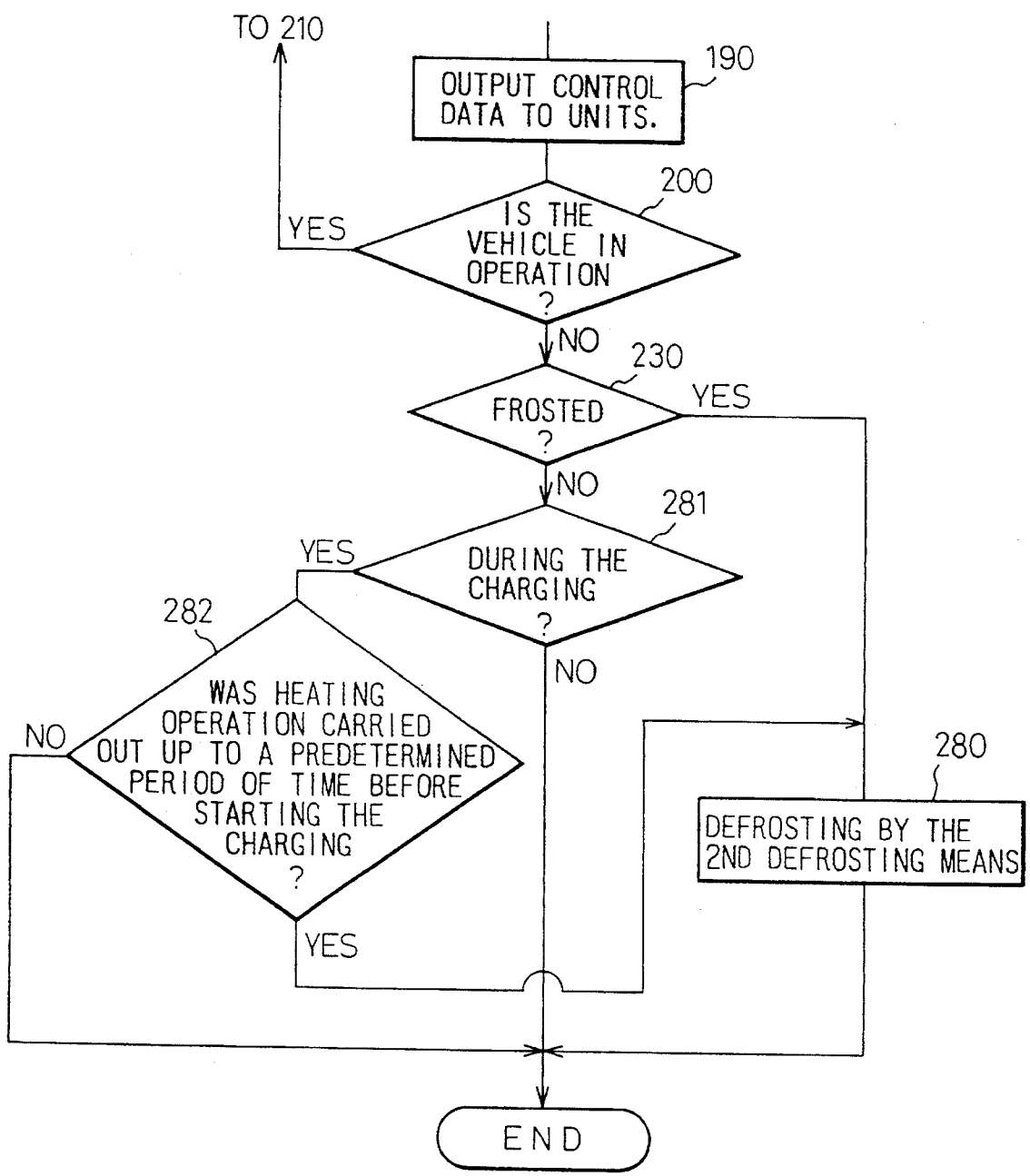
FIG. 12 is a flow chart explaining the operation of a second defrosting means (first embodiment).

Next, described below with reference to a flow chart of FIG. 12 is another example of the operation of the second defrosting means for defrosting the external heat exchanger 333 in the state where no passenger is on board. The flow chart of FIG. 12 illustrates the procedure of operations that are continued from the step 190 in the flow chart of FIG. 11.

In a state where the key switch stays turned off (step 200), it is judged whether the external heat exchanger 333 is frosted or not (step 230). This judgement on the formation of frost is accomplished by a widely known method of detecting the frost. In this embodiment, however, the formation of frost is detected slightly earlier than the case when the key switch is turned on.

When the judged result at the step 230 is YES, the external heat exchanger 333 is defrosted by the second defrosting method which features a higher defrosting ability than the first defrosting method (step 280). When the defrosting operation is finished, the program is also finished.

When the judged result at the step 230 is NO, it is judged at a step 281 whether the batteries 367 are being electrically charged and whether the heating operation had been carried out up to a predetermined period of time (e.g., one hour) before starting the electric charging (step 282). When the judged result at the step 282 is YES, the program proceeds to a step 280 and the external heat exchanger 333 is defrosted by the second defrosting method (an efficient defrosting method in which the cold air is blown into the passenger compartment). The program is finished when the judged result at the step 282 is NO.

According to this embodiment, when the external heat exchanger 333 is frosted in a state in which the passengers are on board, the defrosting operation is carried out while blowing the warm air into the passenger compartment. Therefore, the defrosting operation is carried out causing the passengers to feel as little discomfort as possible without chilling the air in the passenger compartment.

In a state in which no passenger is on board, the defrosting operation is carried out by blowing the cold air into the passenger compartment. In this case, however, the user of the electric automobile does not feel uncomfortable since he is not on board. The defrosting operation is thus efficiently carried out by blowing out the cold air into the passenger compartment.

Even when the batteries 367 are being electrically charged, furthermore, the external heat exchanger 333 is defrosted by the highly efficient second defrosting method by blowing the cold air into the passenger compartment. In the electric automobile, the batteries are electrically charged every after several hours (after one to three hours), and the defrosting operation is carried out in a relatively short time. Since the defrosting operation is effected during every electric charging, the time can be lengthened after the charging is finished before starting the defrosting operation. That is, the number of times of effecting the defrosting operation can be decreased while the vehicle is running after the charging operation has been finished. Since the number of times of the defrosting operation is decreased while the vehicle is running, the passengers need experience less discomfort caused by the defrosting operation. No passengers are on board while the batteries are being charged, and the user of the electric automobile is free from feeling the uncomfortable blown-out air despite the cold air being blown into the passenger compartment. Employment of the defrosting method which blows out the cold air into the passenger compartment makes it possible to carry out the defrosting operation efficiently even though the interior of the passenger compartment is chilled during the electric charging.

In the above-mentioned embodiment, the second defrosting means was operated even when the key switch was turned off in addition to when the batteries were being charged. The second defrosting means, however, may be operated only when the secondary batteries are being electrically charged.

In the foregoing was mentioned the case where it was judged that the passengers are on board when the key switch was turned on. It is, however, also allowable to judge that the passengers are on board when the key is inserted in the key hole or when the seat belt of the driver's seat is latched.

When the batteries were not being charged and no passenger was on board, the defrosting operation was carried out by the defrosting method of blowing the cold air into the passenger compartment. The defrosting operation, however, may be carried out by halting the blower 304 so that the cold air is not supplied into the passenger compartment.

This liberates the passengers who go on board during the defrosting operation from feeling the uncomfortable cold air.

In the foregoing was described the case where the defrosting operation was carried out irrespective of the state of the external heat exchanger during the period of electric charging after the heating operation is finished. However, the condition for starting the defrosting operation during the charging may be suitably changed such as effecting the defrosting operation in a state where the external heat exchanger is likely to be frosted (by detecting relying upon a widely known frost detecting method whether the external air temperature may drop down to a predetermined temperature in case the temperature of the external heat exchanger 333 has dropped down to a predetermined temperature (e.g., $-5°$ C.)).

During the charging, there is no need to worry about the consumption of the battery, and the external heat exchanger may be defrosted by using a heating means such as an electric heater.

In the foregoing were described examples where different defrosting methods were employed depending upon when the batteries were being electrically charged and when the passengers are on board. The defrosting operation, however, may be carried out by the same defrosting method at both times when the batteries are being electrically charged and when the passengers are on board.

That is, in an embodiment according to the second aspect of the present invention, the air-conditioning device for electric automobiles should comprise a frost judging means for judging the formation of frost on the external heat exchanger, a means which lets the driver know of the formation of frost when it is judged by the frost judging means that the frost is formed when the vehicle is in operation, a means which lets the driver select whether the defrosting operation is to be effected or not despite the vehicle being in operation, and a defrosting operation control means which effects the defrosting operation when the defrosting is selected.

When the defrosting operation is to be carried out while the charging circuit of the secondary batteries is connected to the external power source for charging, the defrosting operation may be carried out by the cooling operation mode.

When the defrosting operation is to be carried out by the choice of the driver while the vehicle is in operation, the defrosting operation may be carried out by the defrosting operation mode and when the defrosting operation is to be carried out while the batteries are being electrically charged, the defrosting operation may be carried out by the cooling operation mode.

We claim:

1. An air-conditioning device for electric automobiles powered by a power source of secondary batteries, comprising:

an internal heat exchanger installed in a blast duct that sends air into a passenger compartment;

an external heat exchanger for exchanging heat with external air;

a compressor provided in a coolant circulation circuit that includes said internal heat exchanger and said external heat exchanger, and compresses a coolant; and an electric motor which is rotated by the power source of said secondary batteries to drive said compressor; wherein, during the heating operation, the high-temperature gaseous coolant supplied from said compressor is fed to said internal heat exchanger, so that said internal heat exchanger works as a source of heat; said air-conditioning device for electric automobiles further comprising:

a frost judging means which judges the formation of frost on said external heat exchanger; wherein, when said frost judging means has detected frost formed on said external heat exchanger, the defrosting operation for said external heat exchanger is inhibited while said vehicle is in operation.

2. An air-conditioning device for electric automobiles according to claim 1, wherein when said frost judging means has detected the frost formed on said external heat exchanger, the defrosting operation for said external heat exchanger is inhibited while said vehicle is in operation, and the defrosting operation for said external heat exchanger is executed after the operation of said vehicle is finished and while the charging circuit of said secondary batteries is being connected to an external power source for charging.

3. An air-conditioning device for electric automobiles powered by a power source of secondary batteries, comprising:

an internal heat exchanger installed in a blast duct that sends air into a passenger compartment;

an external heat exchanger for exchanging heat with external air;

a compressor provided in a coolant circulation circuit that includes said internal heat exchanger and said external heat exchanger, and compresses a coolant; and an electric motor which is rotated by the power source of said secondary batteries to drive said compressor; wherein, during the heating operation, the high-temperature gaseous coolant supplied from said compressor is fed to said internal heat exchanger, so that said internal heat exchanger works as a source of heat; said air-conditioning device for electric automobiles further comprising:

a frost judging means which judges the formation of frost on said external heat exchanger; wherein, when said frost judging means has detected frost formed on said external heat exchanger, the defrosting operation for said external heat exchanger is inhibited while said vehicle is in operation and the operation of said compressor is so controlled that the rotational speed thereof is increased.

4. An air-conditioning device for electric automobiles powered by a power source of secondary batteries, comprising:

an internal heat exchanger installed in a blast duct that sends air into a passenger compartment;

an external heat exchanger for exchanging heat with the external air;

a compressor provided in a coolant circulation circuit that includes said internal heat exchanger and said external heat exchanger, and compresses a coolant; and an electric motor which is rotated by the power source of said secondary batteries to drive said compressor; wherein, during the heating operation, the high-temperature gaseous coolant supplied from said compressor is fed to said internal heat exchanger, so that said internal heat exchanger works as a source of heat; said air-conditioning device for electric automobiles further comprising:

a frost judging means which judges the formation of frost on said external heat exchanger; and a defrosting operation control means which, when said frost judging means has detected frost formed on said external heat exchanger, effects the defrosting operation for said external heat exchanger while said electric motor is electrically connected to the power source for electrically charging said secondary batteries.

5. An air-conditioning device for electric automobiles powered by a power source of secondary batteries, comprising:

an internal heat exchanger installed in a blast duct that sends air into a passenger compartment;

an external heat exchanger for exchanging heat with external air;

a compressor provided in a coolant circulation circuit that includes said internal heat exchanger and said external heat exchanger, and compresses a coolant; and an electric motor which is rotated by the power source of said secondary batteries to drive said compressor; wherein, during the heating operation, the high-temperature gaseous coolant supplied from said compressor is fed to said internal heat exchanger, so that said internal heat exchanger works as a source of heat; said air-conditioning device for electric automobiles further comprising:

a frost judging means which judges the formation of frost on said external heat exchanger; and a defrosting operation control means which, when said frost judging means has detected frost formed on said external heat exchanger, effects the defrosting operation for said external heat exchanger while said secondary batteries are electrically connected to the power source for charging.

6. An air-conditioning device for electric automobiles according to claim 4 or 5, wherein said frost judging means judges the formation of frost relying upon any one of the following four kinds of judgement references as a reference for judging the presence or absence of frost:

frost judgement reference (1);
External air temperature $Tam$–external heat exchanger (coolant) temperature $To \geq$ setpoint temperature, frost judgement reference (2);
External air temperature $Tam \leq$ setpoint temperature,
Heating operation time $\geq$ setpoint time, and
External air humidity $\geq$ setpoint humidity, frost judgement reference (3);
External heat exchanger (coolant) temperature $To \leq$ setpoint temperature,
Heating operation time $\geq$ setpoint time, and frost judgement reference (4);
External air temperature $Tam$–external heat exchanger (coolant) temperature $To \geq$ setpoint temperature,
Heating operation time $\geq$ setpoint time, and
External air humidity $\geq$ setpoint humidity.

7. An air conditioning device for electric automobiles according to claim 4 or 5, wherein when the defrosting operation is to be carried out while the charging circuit of said secondary batteries is connected to the external power source for charging, the defrosting operation is carried out by the cooling operation mode.

* * * * *